(12) United States Patent
Jun et al.

(10) Patent No.: US 12,425,622 B2
(45) Date of Patent: Sep. 23, 2025

(54) METHOD AND APPARATUS FOR ENCODING AND DECODING USING SELECTIVE INFORMATION SHARING BETWEEN CHANNELS BETWEEN CHANNELS

(71) Applicants: ELECTRONICS AND TELECOMMUNICATIONS RESEARCH INSTITUTE, Daejeon (KR); RESEARCH AND BUSINESS FOUNDATION SUNGKYUNKWAN UNIVERSITY, Suwon-si (KR)

(72) Inventors: Dong-San Jun, Daejeon (KR); Jung-Won Kang, Daejeon (KR); Hyunsuk Ko, Daejeon (KR); Sung-Chang Lim, Daejeon (KR); Jin-Ho Lee, Daejeon (KR); Ha-Hyun Lee, Seoul (KR); Byeung-Woo Jeon, Seongnam-si (KR); Hui-Yong Kim, Daejeon (KR); Jee-Yoon Park, Seoul (KR)

(73) Assignees: ELECTRONICS AND TELECOMMUNICATIONS RESEARCH INSTITUTE, Daejeon (KR); RESEARCH AND BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/397,147

(22) Filed: Dec. 27, 2023

(65) Prior Publication Data
US 2024/0163466 A1 May 16, 2024

Related U.S. Application Data

(63) Continuation of application No. 17/695,648, filed on Mar. 15, 2022, now Pat. No. 11,902,553, which is a
(Continued)

(51) Int. Cl.
*H04N 19/44* (2014.01)
*H04N 19/119* (2014.01)
(Continued)

(52) U.S. Cl.
CPC .......... *H04N 19/44* (2014.11); *H04N 19/119* (2014.11); *H04N 19/122* (2014.11);
(Continued)

(58) Field of Classification Search
CPC ............................ H04N 19/44; H04N 19/122
(Continued)

(56) References Cited

U.S. PATENT DOCUMENTS 6,154,493 A 11/2000 Acharya et al.
7,830,959 B2 11/2010 Park et al.
(Continued)

FOREIGN PATENT DOCUMENTS

KR 1020120008228 A 1/2012
KR 1020120138430 A 12/2012
(Continued)

OTHER PUBLICATIONS

High efficiency video coding, Series H: Audiovisual and Multimedia Systems, Infrastructure of audiovisual services—Coding of moving video, Telecommunication Standardization Sector of ITU, International Telecommunication Union, Switzerland, Geneva, Apr. 2013.
(Continued)

*Primary Examiner* — Jeffery A Williams
(74) *Attorney, Agent, or Firm* — Sughrue Mion, PLLC

(57) ABSTRACT

Disclosed herein are a video decoding method and apparatus and a video encoding method and apparatus. Coding decision information of a representative channel of a target block is shared as coding decision information of a target channel of the target block, and decoding of the target block is
(Continued)

performed using the coding decision information of the target channel. Since the coding decision information of the representative channel is shared with an additional channel, repeated signaling of identical coding decision information may be prevented. By means of this prevention, the efficiency of encoding and decoding of the target block or the like may be improved.

17 Claims, 33 Drawing Sheets

Related U.S. Application Data continuation of application No. 16/770,534, filed as application No. PCT/KR2018/015573 on Dec. 7, 2018, now Pat. No. 11,310,517.

(51) Int. Cl.
    *H04N 19/122* (2014.01)
    *H04N 19/186* (2014.01)
    *H04N 19/593* (2014.01)
    *H04N 19/60* (2014.01)
    *H04N 19/82* (2014.01)

(52) U.S. Cl.
    CPC ......... *H04N 19/186* (2014.11); *H04N 19/593* (2014.11); *H04N 19/60* (2014.11); *H04N 19/82* (2014.11)

(58) Field of Classification Search
    USPC .................................................. 375/240.12
    See application file for complete search history.

(56) References Cited

U.S. PATENT DOCUMENTS

| | | | |
|---|---|---|---|
| 9,667,997 B2 | 5/2017 | An et al. | |
| 10,506,243 B2 | 12/2019 | Kim et al. | |
| 10,623,768 B2 | 4/2020 | Jeon et al. | |
| 2003/0156718 A1 | 8/2003 | Candelore et al. | |
| 2004/0252760 A1* | 12/2004 | Winger | H04N 19/593 |
| | | | 375/240.03 |
| 2007/0230575 A1 | 10/2007 | Han | |
| 2012/0008683 A1 | 1/2012 | Karczewicz et al. | |
| 2012/0263229 A1 | 10/2012 | Lim et al. | |
| 2013/0294524 A1* | 11/2013 | Van Der Auwera ... | H04N 19/60 |
| | | | 375/240.18 |
| 2014/0003518 A1 | 1/2014 | Bang et al. | |
| 2014/0010283 A1 | 1/2014 | Lim et al. | |
| 2015/0063446 A1* | 3/2015 | Sugio | H04N 19/105 |
| | | | 375/240.03 |
| 2015/0110180 A1 | 4/2015 | An et al. | |
| 2015/0117521 A1 | 4/2015 | Lim et al. | |
| 2015/0172658 A1 | 6/2015 | Kim et al. | |
| 2015/0326881 A1 | 11/2015 | Ikai et al. | |
| 2017/0064308 A1 | 3/2017 | Lin et al. | |
| 2017/0272782 A1 | 9/2017 | Li et al. | |
| 2017/0332106 A1 | 11/2017 | Kalevo et al. | |
| 2019/0104322 A1* | 4/2019 | Tsukuba | H04N 19/61 |
| 2019/0110076 A1 | 4/2019 | Lim et al. | |
| 2019/0306516 A1* | 10/2019 | Misra | H04N 19/593 |

FOREIGN PATENT DOCUMENTS

| | | | | |
|---|---|---|---|---|
| KR | 1020140007283 A | | 1/2014 | |
| KR | 1020140043027 A | | 4/2014 | |
| KR | 1020150027788 A | | 3/2015 | |
| KR | 1020160141696 A | | 12/2016 | |
| KR | 20170020838 A | * | 2/2017 | ............ H04N 19/61 |
| KR | 101789478 | | 10/2017 | |

OTHER PUBLICATIONS

Jianle Chen et al., Algorithm Description of Joint Exploration Test Model 3, Joint Video Exploration Team (JVET) of ITU-T SG 16 WP 3 and ISO/IEC JTC 1/SC 29/WG 11, Document: JVET-C1001_v3, 3rd Meeting: Geneva, CH, May 26-Jun. 1, 2016.

* cited by examiner

DIAGONAL SCANNING

METHOD AND APPARATUS FOR ENCODING AND DECODING USING SELECTIVE INFORMATION SHARING BETWEEN CHANNELS BETWEEN CHANNELS

CROSS-REFERENCE TO RELATION APPLICATIONS

This is a continuation of U.S. application Ser. No. 17/695,648 filed Mar. 15, 2022, which is a continuation application of U.S. application Ser. No. 16/770,534, filed on Jun. 5, 2020, which was the National Stage of International Application No. PCT/KR2018/015573 filed on Dec. 7, 2018, and claims priority under 35 U.S.C. § 119(a) to Korean patent application number 10-2017-0167729, filed on Dec. 7, 2017, Korean patent application number 10-2018-0079012, filed on Jul. 6, 2018, Korean patent application number 10-2018-0106479, filed on Sep. 6, 2018, Korean patent application number 10-2018-0114333, filed on Sep. 21, 2018, and Korean patent application number 10-2018-0157404, filed on Dec. 7, 2018, in the Korean Intellectual Property Office, the entire disclosure of which are incorporated herein by reference.

TECHNICAL FIELD

The following embodiments relate generally to a video decoding method and apparatus and a video encoding method and apparatus, and more particularly, to a video decoding method and apparatus and a video encoding method and apparatus that use sharing of selective information between channels.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a target picture using temporally previous pictures and/or temporally subsequent pictures. Intra-prediction technology may be technology for predicting the value of a pixel included in a target picture using information about pixels in the target picture. Entropy-coding technology may be technology for assigning short code words to frequently occurring symbols and assigning long code words to rarely occurring symbols.

Recently, demand for high-quality images, such as Ultra-High-Definition (UHD) images, which can provide high resolution, a further broadened color space, and excellent image quality, has increased in various application fields. As images trend toward higher-resolution and higher-quality images, the amount of image data required in order to provide images may be increased beyond that of existing image data. With the increase in the amount of image data, transmission costs and storage costs are increased in the case where image data is transmitted through communication media, such as wired/wireless broadband lines, or various broadcasting media, such as satellites, terrestrial waves, an Internet Protocol (IP) network, a wireless network, a cable, or a mobile communication network, or in the case where image data is stored in various types of storage media, such as a Compact Disc (CD), a Digital Versatile Disc (DVD), a Universal Serial Bus (USB) medium, and a High-Definition (HD)-DVD.

As high-resolution and high-quality images are used, high-efficiency image encoding/decoding technology is required in order to solve inevitable and more serious problems with image data and provide images having higher resolution and higher image quality.

DISCLOSURE

Technical Problem

An embodiment is intended to provide an encoding apparatus and method and a decoding apparatus and method that use sharing of selective information between channels.

Technical Solution

In accordance with an aspect, there is provided a decoding method, including sharing coding decision information of a representative channel of a target block as coding decision information of a target channel of the target block; and performing decoding on the target block that uses the coding decision information of the target channel.

The decoding method may further include receiving a bitstream including information about the target block.

The information about the target block may include the coding decision information of the representative channel.

The information about the target block may not include the coding decision information of the target channel.

The coding decision information of the representative channel may be transform skip information indicating whether a transform is to be skipped.

The coding decision information of the representative channel may indicate which transform is to be used for a transform block of a channel.

The coding decision information of the representative channel may be intra-coding decision information of the representative channel.

The representative channel and the target channel may be channels in a YCbCr color space.

The representative channel may be a luma channel.

The target channel may be a chroma channel.

The representative channel may be a color channel having a highest correlation with a luma signal.

The representative channel may be determined by an index indicating a selected representative channel in a bitstream.

The sharing may be performed when image properties of multiple channels of the target block are similar to each other.

When an intra-prediction mode of a chroma channel of the target block is a direct mode, the image properties of the multiple channels may be determined to be similar to each other.

The sharing may be performed when cross-channel prediction is used.

Whether the cross-channel prediction is used may be derived based on information acquired from a bitstream.

The sharing may be performed when cross-channel prediction is used.

Whether the cross-channel prediction is used may be determined based on an intra-prediction mode of the target block.

When the intra-prediction mode of the target block is one of an INTRA_CCLM mode, an INTRA_MMLM mode, and an INTRA_MFLM mode, cross-channel prediction may be used.

Whether sharing is to be performed may be determined based on a size of the target block.

The coding decision information of the representative channel, among multiple channels of the target block, may be used for all of the multiple channels.

In accordance with another aspect, there is provided an encoding method, including determining coding decision information of a representative channel of a target block; and performing encoding on the target block that uses the coding decision information of the representative channel, wherein the coding decision information of the representative channel is shared with an additional channel of the target block.

The encoding method may further include generating a bitstream including information about the target block.

The information about the target block may include the coding decision information of the representative channel.

The information about the target block may not include coding decision information of the additional channel.

The representative channel and the additional channel may be channels in a YCbCr color space.

In accordance with a further aspect, there is provided a computer-readable storage medium storing a bitstream for image decoding, the bitstream including information about a target block, wherein the information about the target block includes coding decision information of a representative channel of the target block, wherein the coding decision information of the representative channel of the target block is used and shared as coding decision information of a target channel of the target block, and wherein decoding of the target block is performed using the coding decision information of the target channel.

Advantageous Effects

There are provided an encoding apparatus and method and a decoding apparatus and method that use sharing of selective information between channels.

BEST MODE

Figure 1:
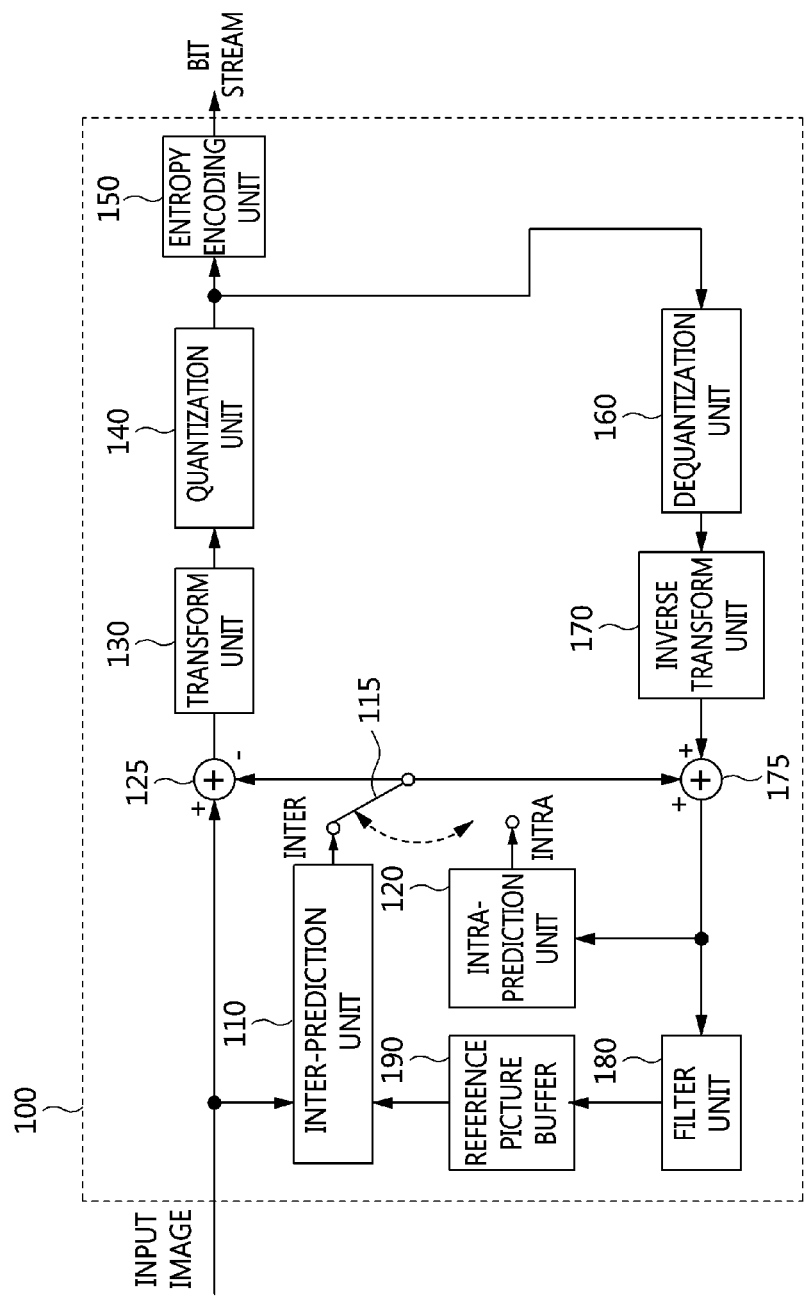
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "−0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may denote the degree to which the unit is partitioned. Further, the unit depth may indicate the level at which the corresponding unit is present when units are represented in a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb. Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a target picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the target picture, or may correspond to the location of the target unit in the target picture.

Parameter set: A parameter set may be header information in the structure of a bitstream. For example, a parameter set may include a video parameter set, a sequence parameter set, a picture parameter set, an adaptation parameter set, etc.

Further, the parameter set may include slice header information and tile header information.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda*R \qquad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between a target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as prediction type information, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM usage indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium. Information signaled by an encoding apparatus may be used by a decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighboring block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level or a quantized level by quantizing the transform coefficient depending on quantization parameters. The quantization unit 140 may output the quantized transform coefficient level or the quantized level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), information indicating whether a unit/block is partitioned in a ternary tree structure, the partitioning direction of a ternary tree structure (horizontal direction or vertical direction), the partitioning form of a ternary tree structure (symmetrical partitioning or asymmetrical partitioning, etc.), information indicating whether a unit/block is partitioned in a complex tree structure, a combination and a direction (horizontal direction or vertical direction, etc.) of a partitioning of the complex tree structure, a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, first transform selection information (or a first transform index), secondary transform selection information (or a secondary transform index), information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal. The prediction scheme may denote one prediction mode of an intra prediction mode and an inter prediction mode.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The coefficient that has been inversely quantized and/or inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, an Adaptive Loop Filter (ALF) and a Non Local Filter (NLF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, a filter corresponding to any one of a strong filter and a weak filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. For a luma signal, information related to whether to apply an adaptive loop filter may be signaled for each CU. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
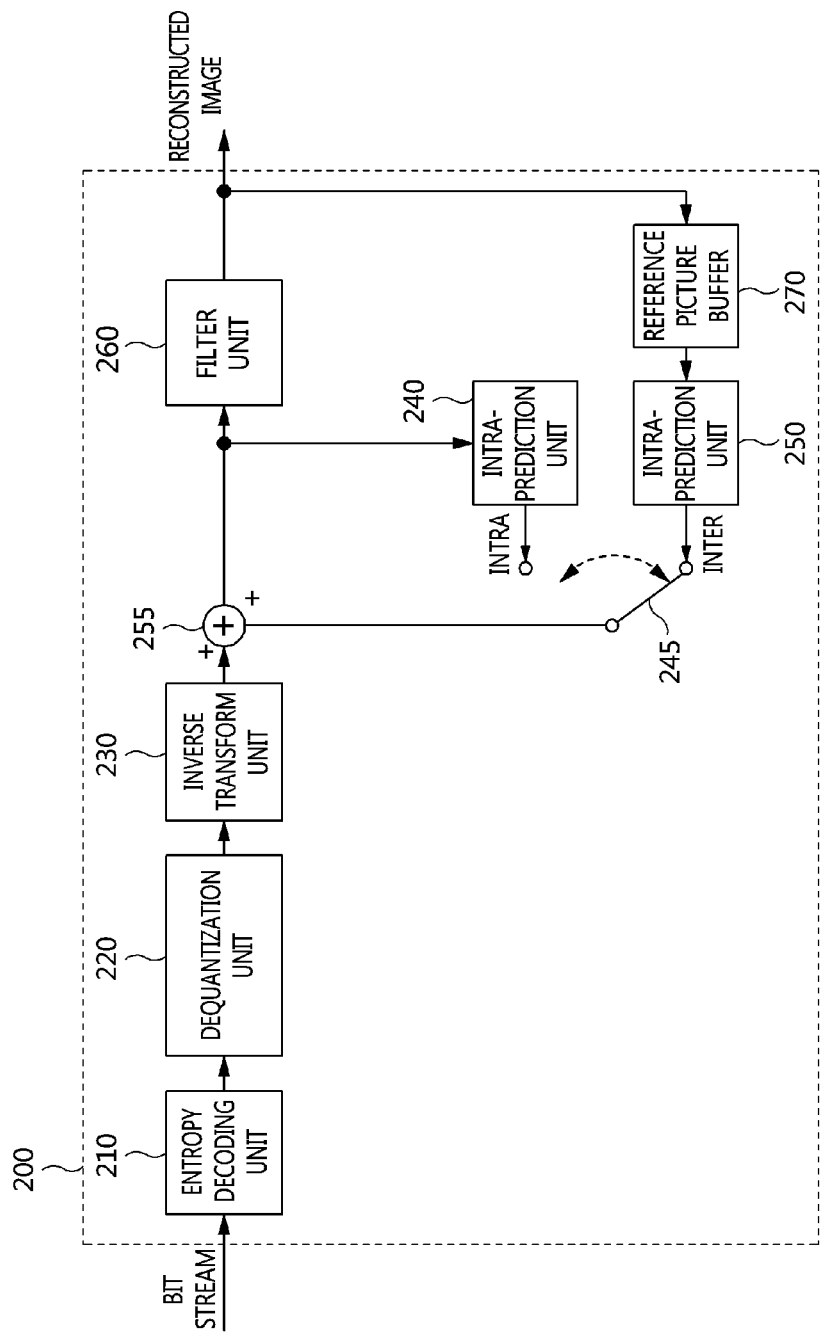
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include quantized transform coefficient level-format symbols. Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The reconstructed image subjected to filtering may be outputted by the encoding apparatus 100, and may be used by the encoding apparatus.

The reconstructed image subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction.

Figure 3:
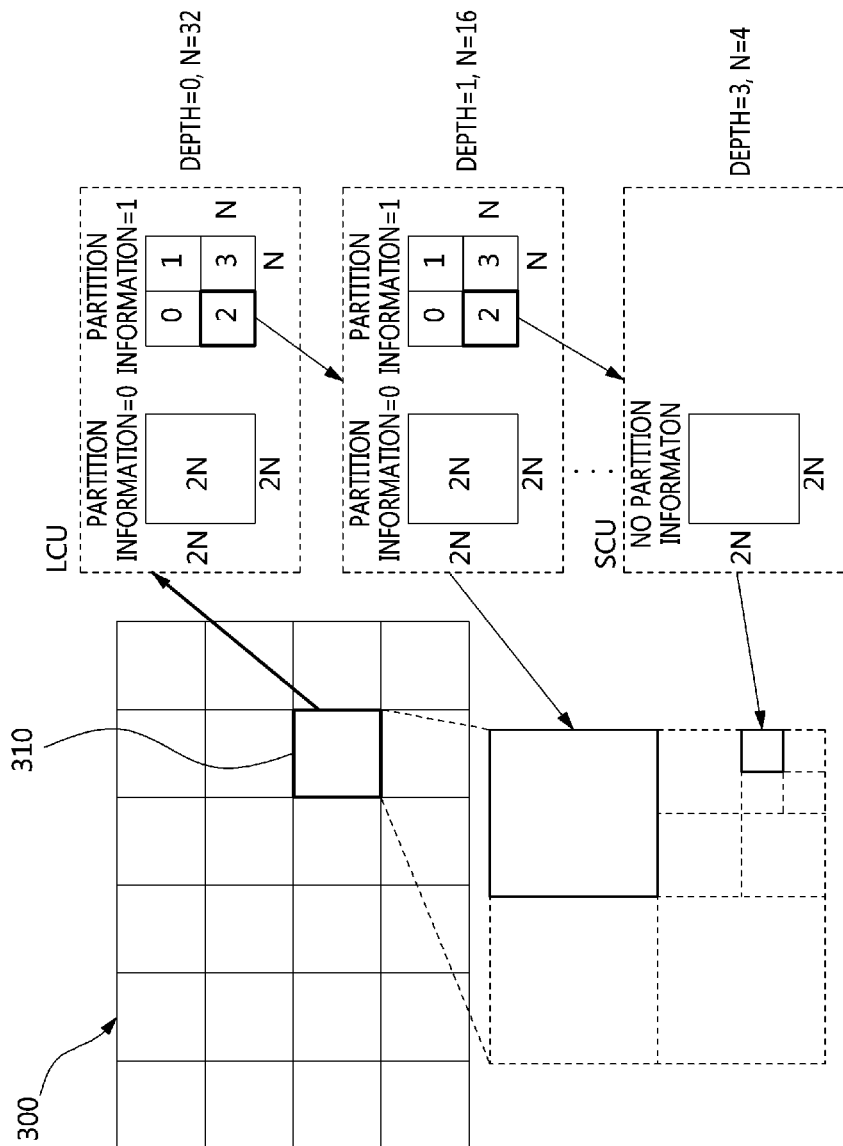
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of a CU may have a value ranging from 0 to 3. The size of the CU may range from a size of 64×64 to a size of 8×8 depending on the depth of the CU.

For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

Figure 4:
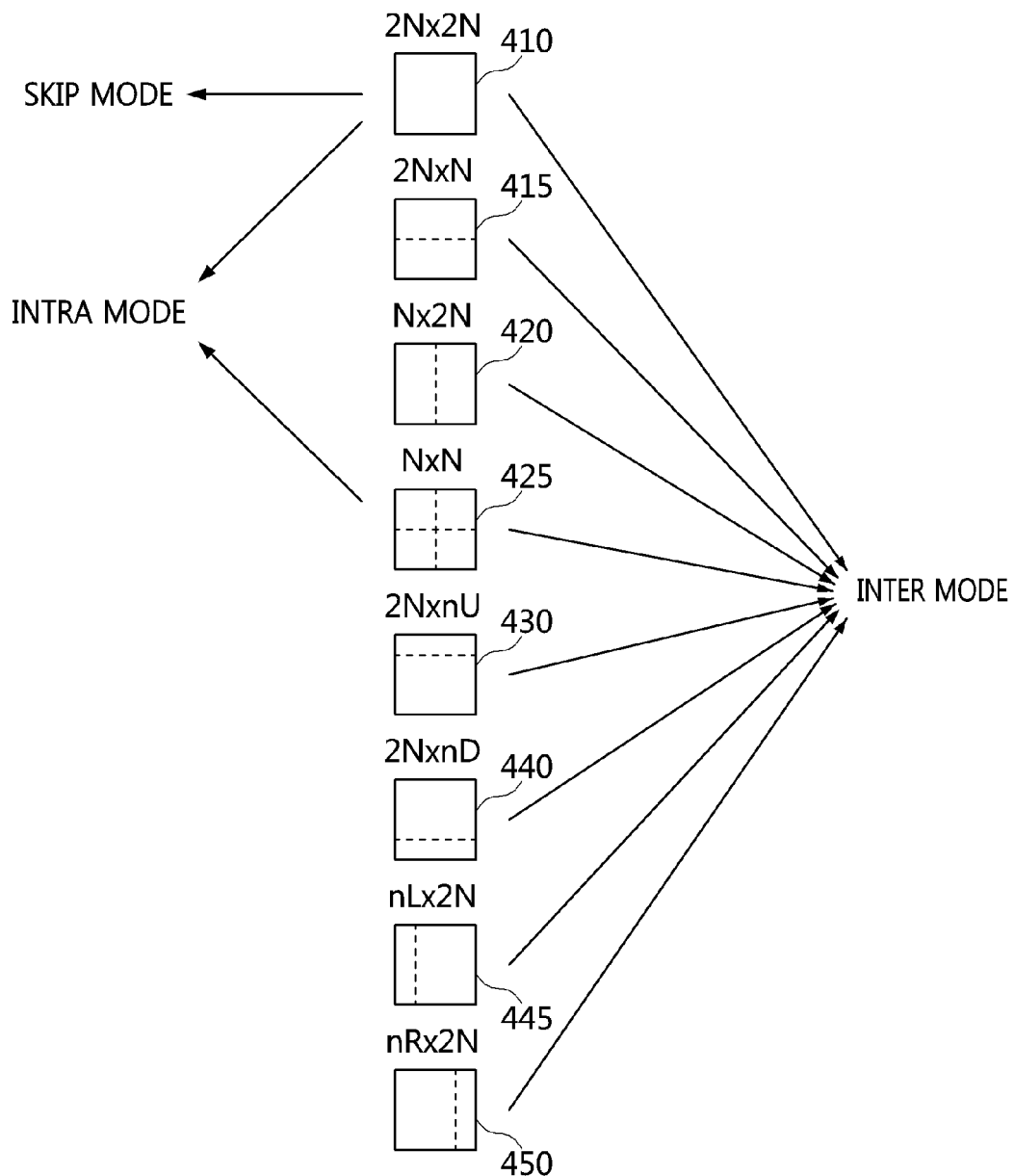
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
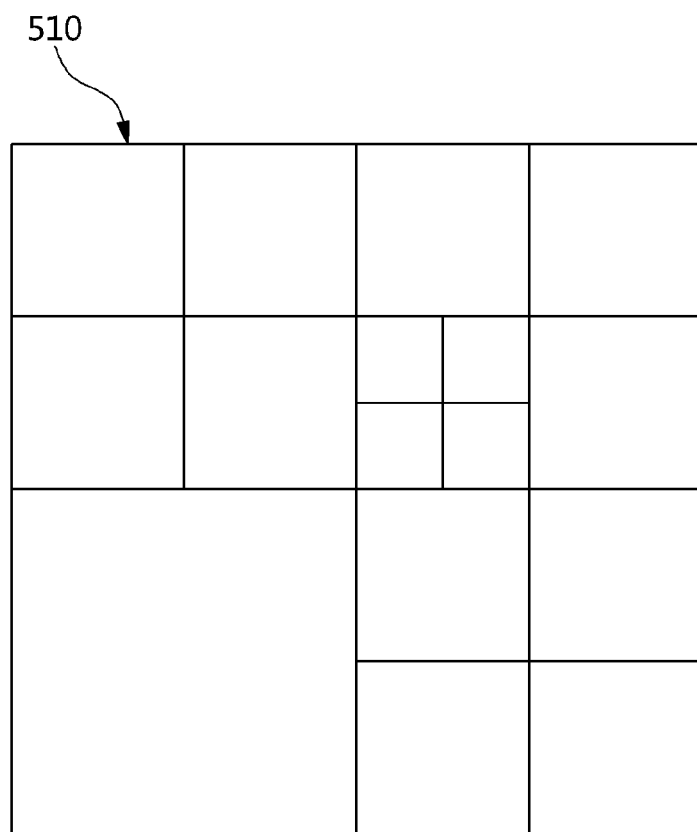
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
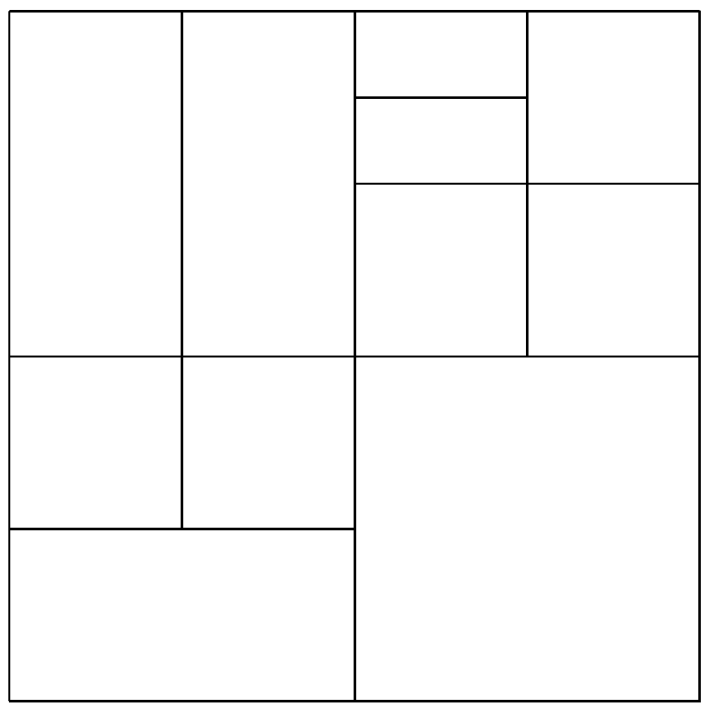
FIG. 6 illustrates splitting of a block according to an example.

FIG. 6 illustrates the splitting of a block according to an example.

In a video encoding and/or decoding process, a target block may be split, as illustrated in FIG. 6.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| | 0 | |
| 0 | | |
| | 0 | |

TABLE 1-continued

| quadtree_flag | binarytree_flag | Btype_flag |
|---|---|---|
| 0 | | |
| | 1 | |
| | | 0 |
| | 1 | |
| | | 1 |
| | 0 | |
| | 0 | |
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree firm is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible.

In this case, split_flag may be a flag indicating whether splitting in a quad-tree form is performed.

When the size of a block falls within the specific range, only splitting in a binary tree form may be possible. For example, the specific range may be defined by at least one of a maximum block size and a minimum block size at which only splitting in a binary tree form is possible.

Information indicating the maximum block size and/or the minimum block size at which only splitting in a binary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form is performed.

The splitting of a block may be limited by previous splitting. For example, when a block is split in a binary tree form and multiple partition blocks are generated, each partition block may be additionally split only in a binary tree form.

When the horizontal size or vertical size of a partition block is a size that cannot be split further, the above-described indicator may not be signaled.

Figure 7:
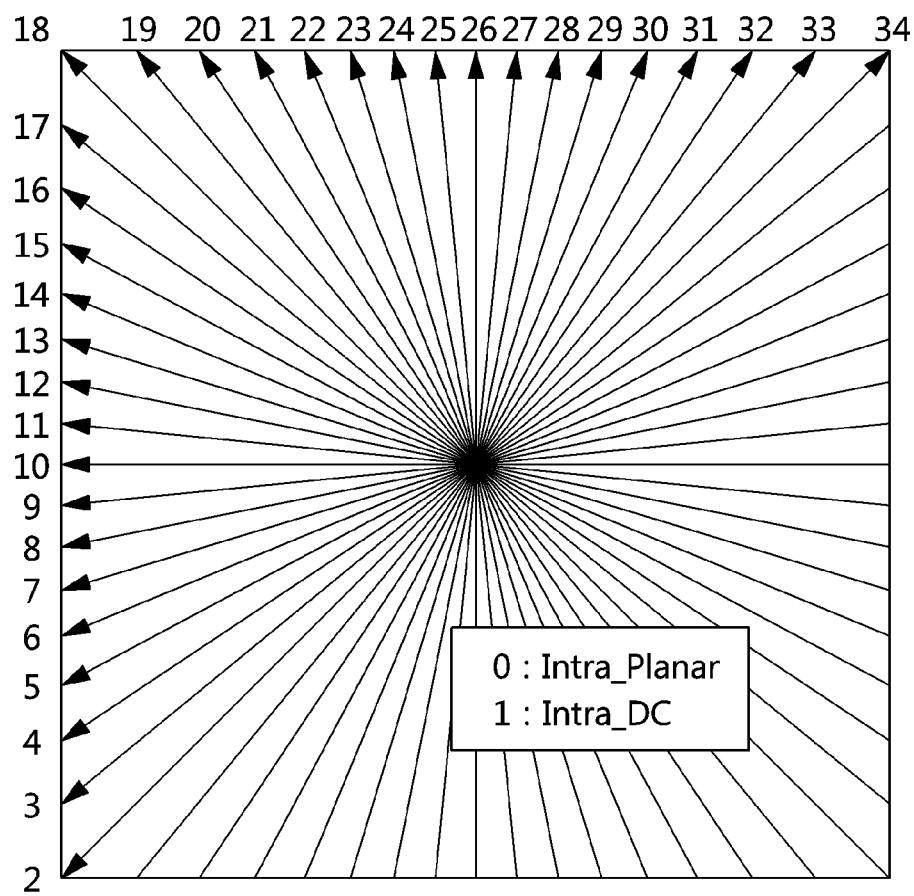
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 7.

The two non-directional modes may include a DC mode and a planar mode.

The directional modes may be prediction modes having a specific direction or a specific angle.

The intra-prediction modes may each be represented by at least one of a mode number, a mode value, and a mode angle. The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size and/or the color component of a block. For example, the number of intra-prediction modes may be fixed at any one of 35 and 67 regardless of the size of a block.

Alternatively, the number of intra-prediction modes may differ depending on the size of a block and/or the type of color component.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample. For example, in a horizontal mode having a mode value of 10, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the target block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the number of filter taps, the value of a filter coefficient, and filter strength.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and a neighboring block are different from each other, information about the intra-prediction mode of the target block may be encoded and/or decoded using entropy encoding and/or decoding.

Figure 8:
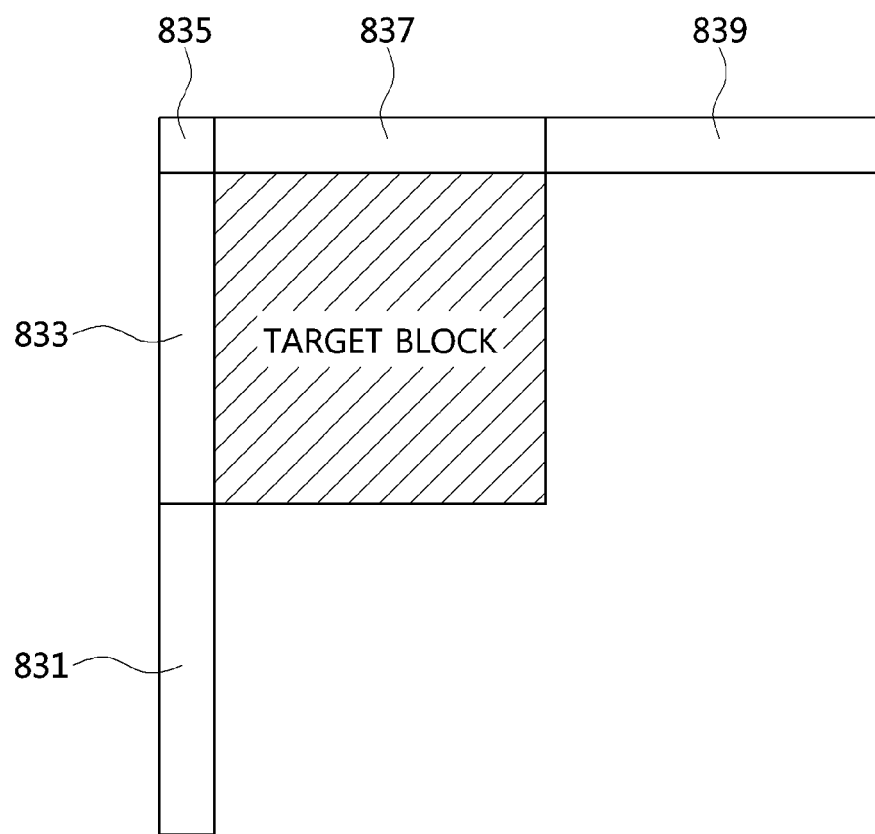
FIG. 8 is a diagram for explaining the locations of reference samples used in an intra-prediction procedure.

FIG. 8 is a diagram for explaining the locations of reference samples used in an intra-prediction procedure.

FIG. 8 illustrates the locations of reference samples used for intra prediction of a target block. Referring to FIG. 8, reconstructed reference samples used for intra prediction of the target block may include below-left reference samples 831, left reference samples 833, an above-left corner reference sample 835, above reference samples 837, and above-right reference samples 839.

For example, the left reference samples 833 may mean reconstructed reference pixels adjacent to the left side of the target block. The above reference samples 837 may mean reconstructed reference pixels adjacent to the top of the target block. The above-left corner reference sample 835 may mean a reconstructed reference pixel located at the above-left corner of the target block. The below-left reference samples 831 may mean reference samples located below a left sample line composed of the left reference samples 833, among samples located on the same line as the left sample line. The above-right reference samples 839 may mean reference samples located to the right of an above sample line composed of the above reference samples 837, among samples located on the same line as the above sample line.

When the size of a target block is N×N, the numbers of the below-left reference samples 831, the left reference samples 833, the above reference samples 837, and the above-right reference samples 839 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 837 may be used for intra prediction. When the intra-prediction mode is the vertical mode, the value of a pixel in the prediction block may be the value of a reference sample vertically located above the location of the pixel. Therefore, the above reference samples 837 adjacent to the top of the target block may be used for intra prediction. Furthermore, the values of pixels in one row of the prediction block may be identical to those of the above reference samples 837.

In an example, when the intra-prediction mode of a target block is a horizontal mode having a mode value of 10, the left reference samples 833 may be used for intra prediction. When the intra-prediction mode is the horizontal mode, the value of a pixel in the prediction block may be the value of a reference sample horizontally located left to the location of the pixel. Therefore, the left reference samples 833 adjacent to the left of the target block may be used for intra prediction. Furthermore, the values of pixels in one column of the prediction block may be identical to those of the left reference samples 833.

In an example, when the mode value of the intra-prediction mode of the current block is 18, at least some of the left reference samples 833, the above-left corner reference sample 835, and at least some of the above reference samples 837 may be used for intra prediction. When the mode value of the intra-prediction mode is 18, the value of a pixel in the prediction block may be the value of a reference sample diagonally located at the above-left corner of the pixel.

Further, At least a part of the above-right reference samples 839 may be used for intra prediction in a case that a intra prediction mode having a mode value of 27, 28, 29, 30, 31, 32, 33 or 34 is used.

Further, At least a part of the below-left reference samples 831 may be used for intra prediction in a case that a intra prediction mode having a mode value of 2, 3, 4, 5, 6, 7, 8 or 9 is used.

Further, the above-left corner reference sample 835 may be used for intra prediction in a case that a intra prediction mode of which a mode value is a value ranging from 11 to 25.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 9:
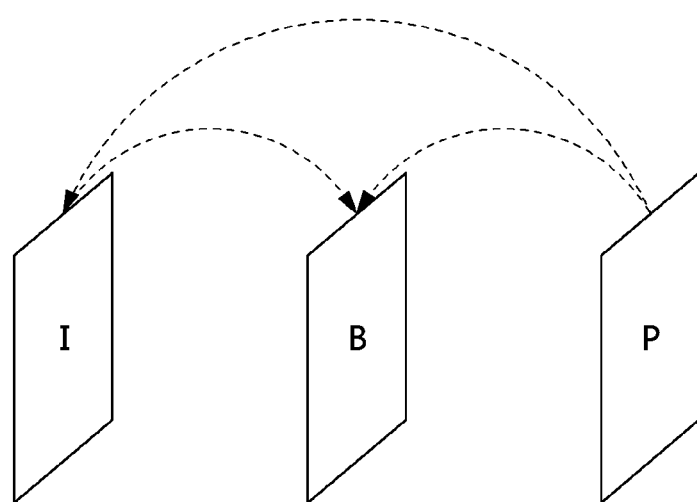
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction may be performed using motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first distance to a second distance. The first distance may be the distance between the reference picture and the target picture of the target block. The second distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block.

The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighboring block. In other words, the motion vector of the reconstructed neighboring block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatial neighboring block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 10) may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

The encoding apparatus 100 may select a merge candidate having the highest encoding performance among the merge candidates included in the merge candidate list and set a value of the merge index to indicate the selected merge candidate.

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVC, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
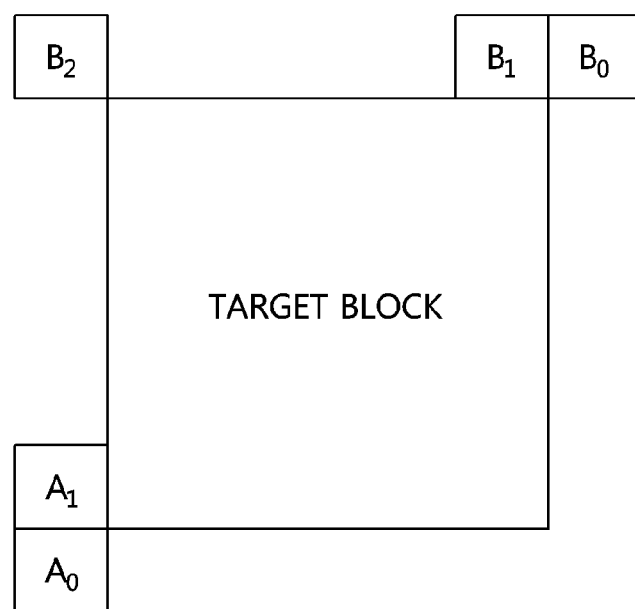
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively. $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
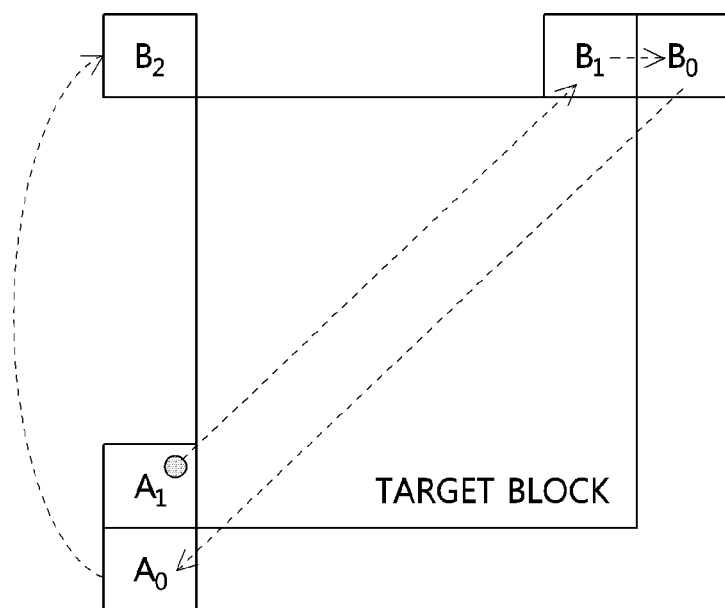
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1, B_1, B_0, A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
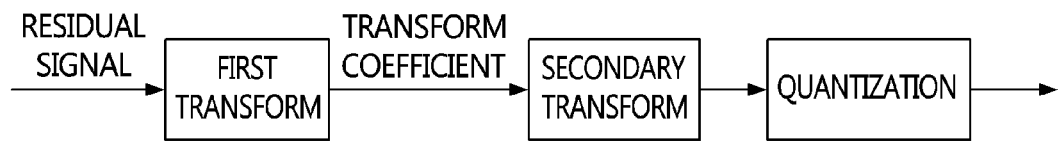
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in the following Table 3.

TABLE 3

| Transform set | Transform candidates |
| --- | --- |
| 0 | DST-VII, DCT-VIII |
| 1 | DST-VII, DST-I |
| 2 | DST-VII, DCT-V |

As shown in Table 3, when a DCT type or a DST type to be used for a transform is derived, transform sets may be used. Each transform set may include multiple transform candidates. Each transform candidate may be a DCT type or a DST type.

The following Table 4 shows examples of a transform set that is applied to a horizontal direction depending on the intra-prediction mode.

TABLE 4

| Intra-prediction mode | Transform set |
| --- | --- |
| 0 | 2 |
| 1 | 1 |
| 2 | 0 |
| 3 | 1 |
| 4 | 0 |
| 5 | 1 |
| 6 | 0 |
| 7 | 1 |
| 8 | 0 |
| 9 | 1 |
| 10 | 0 |
| 11 | 1 |
| 12 | 0 |
| 13 | 1 |
| 14 | 2 |

TABLE 4-continued

| Intra-prediction mode | Transform set |
| --- | --- |
| 15 | 2 |
| 16 | 2 |
| 17 | 2 |
| 18 | 2 |
| 19 | 2 |
| 20 | 2 |
| 21 | 2 |
| 22 | 2 |
| 23 | 1 |
| 24 | 0 |
| 25 | 1 |
| 26 | 0 |
| 27 | 1 |
| 28 | 0 |
| 29 | 1 |
| 30 | 0 |
| 31 | 1 |
| 32 | 0 |
| 33 | 1 |

In Table 4, the number of each transform set to be applied to the horizontal direction of a residual signal is indicated depending on the intra-prediction mode of the target block.

The following Table 5 shows examples of a transform set that is applied to the vertical direction of the residual signal depending on the intra-prediction mode.

TABLE 5

| Intra-prediction mode | Transform set |
| --- | --- |
| 0 | 2 |
| 1 | 1 |
| 2 | 0 |
| 3 | 1 |
| 4 | 0 |
| 5 | 1 |
| 6 | 0 |
| 7 | 1 |
| 8 | 0 |
| 9 | 1 |
| 10 | 0 |
| 11 | 1 |
| 12 | 0 |
| 13 | 1 |
| 14 | 0 |
| 15 | 0 |
| 16 | 0 |
| 17 | 0 |
| 18 | 0 |
| 19 | 0 |
| 20 | 0 |
| 21 | 0 |
| 22 | 0 |
| 23 | 1 |
| 24 | 0 |
| 25 | 1 |
| 26 | 0 |
| 27 | 1 |
| 28 | 0 |
| 29 | 1 |
| 30 | 0 |
| 31 | 1 |
| 32 | 0 |
| 33 | 1 |

As exemplified in FIGS. 4 and 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and/or a horizontal direction) or a selected direction.

Alternatively, an AMT may be referred to as a Multiple Transform Selection (MTS) or Extended Multiple Transform (EMT).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various types depending on a kernel function that defines a DCT or a DST.

For example, the first transform may include transforms, such as DCT-2, DCT-5, DCT-7, DST-1, and DST-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i(j)$ |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \sqrt{\dfrac{2}{N}}\ (i = 0)$ or $1$ (otherwise) |

TABLE 6-continued

| Transform type | Transform kernel function $T_i(j)$ |
|---|---|
| DST-7 | $T_i(j) = \sqrt{\dfrac{4}{2N+1}} \cdot \sin\left(\dfrac{\pi \cdot (2j+1) \cdot (j+1)}{2N+1}\right)$ |
| DCT-5 | $T_i(j) = \omega_0 \cdot \omega_1 \cdot \sqrt{\dfrac{2}{2N-1}} \cdot \cos\left(\dfrac{2\pi \cdot i \cdot j}{2N+1}\right)$ where $\omega_{0/1} = \sqrt{\dfrac{2}{N}}$ ($i$ or $j = 0$) or 1 (otherwise) |
| DST-8 | $T_i(j) = \sqrt{\dfrac{4}{2N+1}} \cdot \cos\left(\dfrac{\pi \cdot (2j+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ |

In Table 6, i and j may be integer values that are equal to or greater than 0 and are less than or equal to N−1.

The secondary transform may be performed on the transform coefficient generated by performing the first transform.

A first transform and/or a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighboring block. For example, whether to apply the first transform and/or the secondary transform may be determined depending on the size and/or shape of the target block.

The transform method(s) to be applied to a first transform and/or a secondary transform may be determined depending on at least one of coding parameters for a target block and/or a neighboring block. The determined transform method may also indicate that a first transform and/or a secondary transform are not used.

Alternatively, transform information indicating a transform method may be signaled from the encoding apparatus 100 to the decoding apparatus 200. For example, the transform information may include the index of a transform to be used for a first transform and/or a secondary transform.

The quantized transform coefficient (i.e. the quantized levels) may be generated by performing quantization on the result, generated by performing the primary transform and/or the secondary transform, or on the residual signal.

Figure 13:
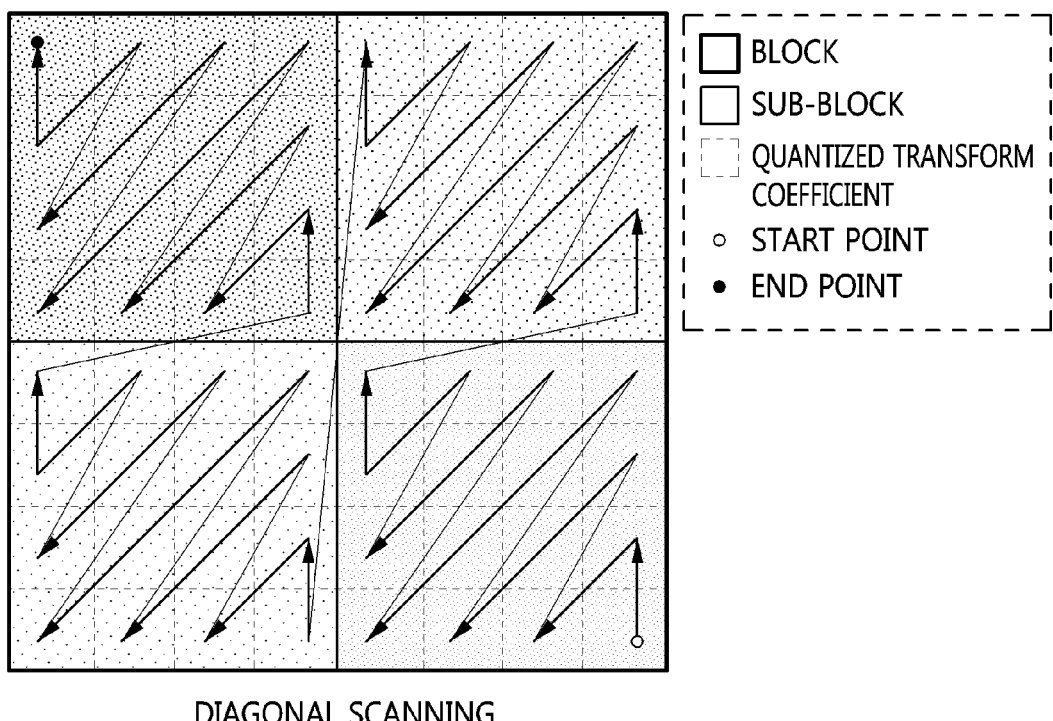
FIG. 13 illustrates diagonal scanning according to an example.

FIG. 13 illustrates diagonal scanning according to an example.

Figure 14:
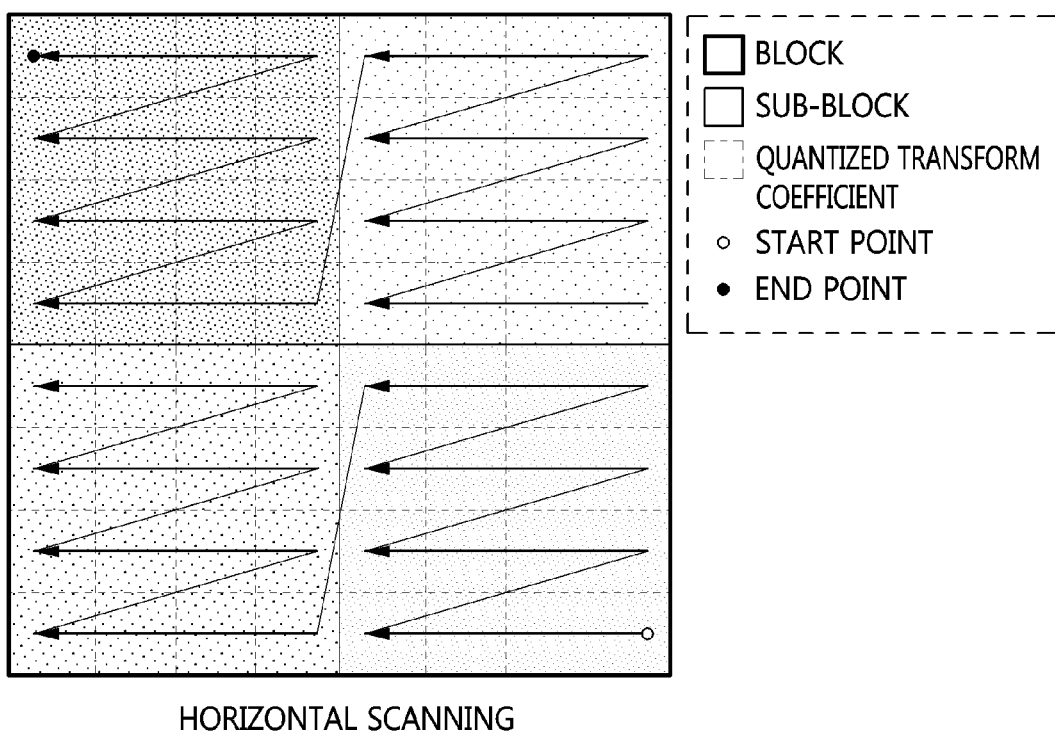
FIG. 14 illustrates horizontal scanning according to an example.

FIG. 14 illustrates horizontal scanning according to an example.

Figure 15:
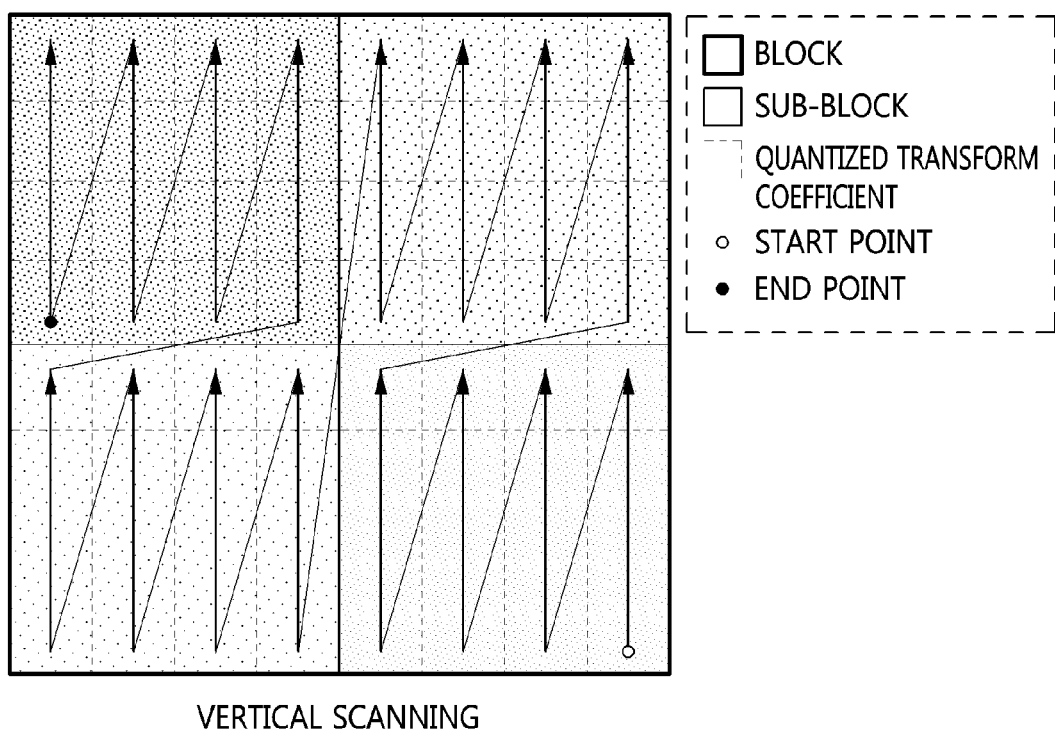
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a primary transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The scanned quantized transform coefficients may be entropy-encoded, and a bitstream may include the entropy-encoded quantized transform coefficients.

The decoding apparatus 200 may generate quantized transform coefficients via entropy decoding on the bitstream. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

Figure 16:
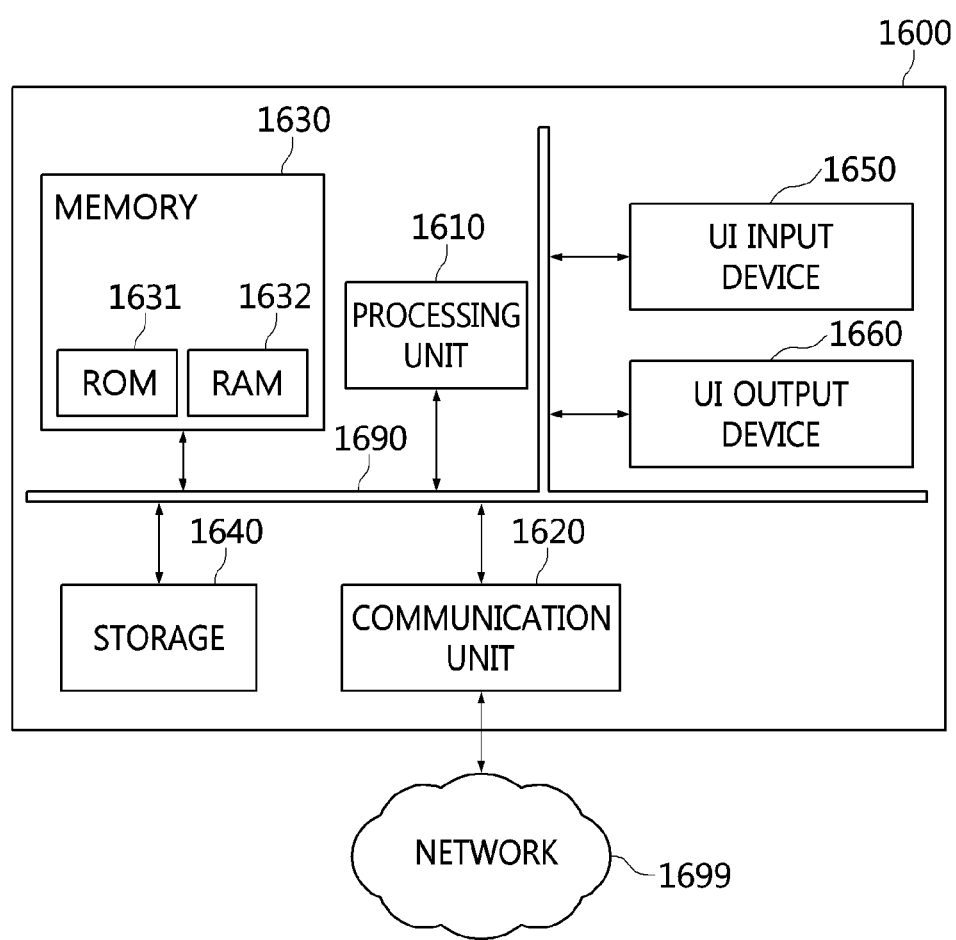
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1220.

For example, the communication unit 1620 may transmit a bitstream to a decoding apparatus 1600, which will be described later.

Figure 17:
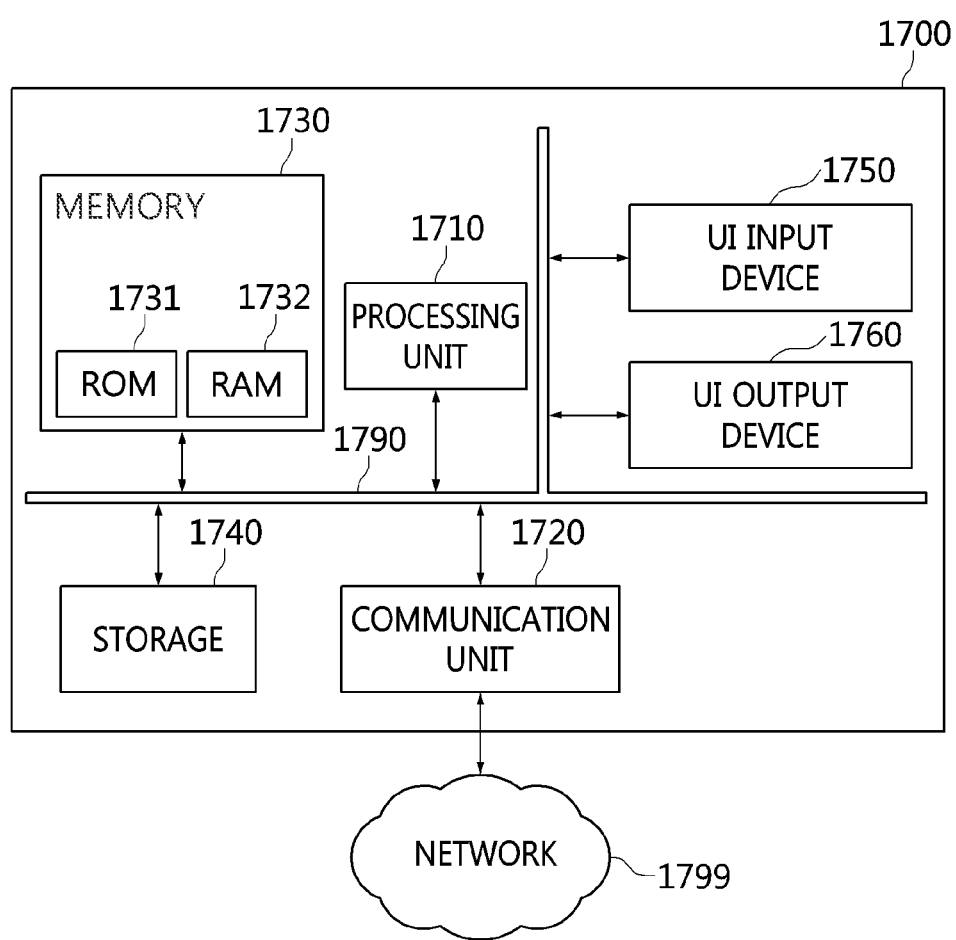
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1399.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1600.

Image-Processing Method Using Sharing of Information Between Channels

A method and apparatus according to embodiments may apply transform-coding (transcoding) technology that uses prediction and various transforms to high-resolution images, such as 4K or 8K resolution images, may encode and/or decode images by sharing various types of predefined coding decision information between channels, and may decode a compressed bitstream or compressed data for encoded images by sharing transmitted coding decision information between channels.

Multiple channels may mean multiple components representing a block. For example, the multiple channels may include a color channel, a depth channel, an alpha channel, etc.

Hereinafter, the terms "channel" and "color" may have the same meaning, and may be used interchangeably with each other. Further, the term "color" may indicate one of channels. The term "channel" may be used interchangeably with one or more of the terms "color", "depth", and "alpha".

Technology in the present embodiment may be used, and thus the problem of deteriorated compressibility and image quality, which occurs when conventional technology is applied to encoding and decoding of images, can be solved. In particular, when conventional technology is applied to images in which variation in pixel values is spatially concentrated, the problem of the deterioration of compressibility and image quality may be severe.

In an example, as various types of coding decision information that are shared between channels to perform encoding and decoding according to an embodiment, the following pieces of information are present. In the names of the following information, "flag" may be omitted.

1) Transform skip flag (transform_skip_flag) information may indicate whether to selectively skip a transform. Alternatively, the transform_skip_flag information may indicate one of the use of a transform and the skipping of a transform.

2) Intra smoothing filtering information may indicate whether smoothing filtering is applied to reference pixels that are used in intra-prediction.

3) Position-Dependent intra-Prediction Combination (PDPC) flag (PDPC_flag) information may indicate whether intra-prediction is to be performed by using neighbor pixels to which smoothing (i.e. filtering) is applied and neighbor pixels to which smoothing (i.e. filtering) is not applied together when specific intra-prediction (e.g. planar prediction) is performed.

4) Residual Differential Pulse Coded Modulation (RDPCM) flag (rdpcm_flag) information may indicate whether RDPCM of additionally performing Differential Pulse Coded Modulation (DPCM) on a residual signal, acquired via one prediction, and of again acquiring a residual signal is to be performed.

5) Multiple Transform Selection (MTS) flag (mts_flag) information may indicate whether an encoding method based on an Extended Multiple Transform (EMT) is to be used.

EMT may be an encoding method that selects and uses a specified transform for a transform block, which is a target block among provided multiple transforms.

EMT may also stand for "enhanced multiple transform", and may also indicate "Multiple Transform Selection (MTS).

6) EMT flag information may indicate whether EMT is to be used.

7) MTS index (mts_idx) information may indicate which transforms are to be used in a horizontal direction and a vertical direction when MTS is used.

A part of the mts_idx information (e.g. one specified bit in mts_idx) may be information indicating the transform that is used in the horizontal direction of a residual signal.

Another part of the mts_idx information or a part of the remainder of the mts_idx information (e.g. one other specified bit in mts_idx) may be information indicating a transform that is used in the vertical direction of a residual signal.

For example, the decision of a transform depending on the mts_idx information may be configured as shown in the following Tables 7 and 8.

TABLE 7

| Intra-prediction mode | mts_idx information | Transform in horizontal direction | Transform in vertical direction |
| --- | --- | --- | --- |
| 1 | 0 | DCT-7 | DCT-7 |
|  | 1 | DCT-5 |  |
|  | 2 | DCT-7 | DCT-5 |
|  | 3 | DCT-5 |  |
| 1, 3, 5, 7, 9, 11, 13, 23, | 0 | DCT-7 | DCT-7 |
| 25, 27, 29, 31, 33, 35, | 1 | DCT-1 |  |
| 39, 41, 43, 45, 55, 57, | 2 | DCT-7 | DCT-1 |
| 59, 61, 63, 65 | 3 | DCT-1 |  |
| 2, 4, 6, 8, 10, 12, 24, | 0 | DCT-7 | DCT-7 |
| 26, 28, 30, 32, 34, 36, | 1 | DCT-8 |  |
| 38, 40, 42, 44, 56, 58, | 2 | DCT-7 | DCT-8 |
| 60, 64, 66 | 3 | DCT-8 |  |
| 14, 15, 16, 17, 18 19, | 0 | DCT-7 | DCT-7 |
| 20, 21, 22 | 1 | DCT-5 |  |
| (angles neighboring | 2 | DCT-7 | DCT-8 |
| horizontal directions) | 3 | DCT-5 |  |
| 46, 47, 48, 49, 50, 51, | 0 | DCT-7 | DCT-7 |
| 52, 53, 54 (angles | 1 | DCT-8 |  |
| neighboring vertical | 2 | DCT-7 | DCT-5 |
| directions) | 3 | DCT-8 |  |

TABLE 8

| MTS_CU_flag | MTS_Hor_flag | MTS_Ver_flag | Intra/inter Horizontal | Vertical |
|---|---|---|---|---|
| 0 | | | DCT-2 | |
| | 0 | 0 | DST-7 | DST-7 |
| | 0 | 1 | DCT-8 | DST-7 |
| | 1 | 0 | DST-7 | DCT-8 |
| | 1 | 1 | DCT-8 | DCT-8 |

In Table 7, the transforms in a horizontal direction and the transforms in a vertical direction that are used depending on the values of the intra-prediction mode and mts_idx information are exemplified.

In accordance with Table 7, when mis_idx information is acquired so as to perform intra-prediction or inter-prediction of a target block, a transform in a horizontal direction and a transform in a vertical direction that are to be used for the transform of the target block may be decided on depending on the value of the mts_idx information.

For example, when the intra-prediction mode of the target block is 6 and the value of the mts_idx information is 2, DCT-7 may be used as the transform in a horizontal direction, and DCT-8 may be used as the transform in a vertical direction.

Table 8 illustrates an example of a modification of Table 7. In Table 8, MTS_CU_flag may indicate that flag information mts_flag, indicating whether a Multiple Transform Selection (MTS) method is used, is decided on and transmitted on a CU basis. Also, MTS_Hor_flag and MTS_Ver_flag may respectively indicate a transform used in a horizontal direction and a transform used in a vertical direction. Table 8 may exemplify transforms used in the horizontal direction and the vertical direction through the values of MTS_Hor_flag and MTS_Ver_flag.

Alternatively, the decision of transforms depending on the mts_idx information of Table 7 may be configured as shown in the following Table 9.

TABLE 9

| | Intra-prediction | | Inter-prediction | |
|---|---|---|---|---|
| mts_idx information | Horizontal transform type | Vertical transform type | Horizontal transform type | Vertical transform type |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

In Table 9, in intra-prediction and inter-prediction, the horizontal transform types and the vertical transform types that are used depending on the values of the mts_idx information are exemplified.

Respective values of the horizontal transform types may indicate specific transforms. For example, the value "1" of a horizontal transform type may represent DST-7. The value "2" of a horizontal transform type may represent DCT-8.

8) Non-Separable Secondary Transform (NSST) flag (nsst_flag) information may indicate whether an NSST encoding method for additionally performing a non-separable secondary transform on all or some transform coefficients acquired via a primary transform is to be used.

9) NSST index (nsst_idx) information may indicate the type of secondary transform to be applied to all or some transform coefficients when the NSST encoding method is used.

The nsst_idx information may indicate the transform to be used for a non-separable secondary transform.

10) CU skip flag information may indicate whether the transmission of encoded data about a CU is to be skipped.

11) CU Local Illumination Compensation (LIC) flag (CU_lic_flag) information may indicate whether to compensate for the difference between the brightness values of blocks.

12) Overlapped Block Motion Compensation (OBMC) flag (obmc_flag) information may indicate whether to generate the final motion compensation block using multiple overlapped motion compensation blocks.

13) codeAlfCtuEnable flag (codeAlfCtuEnable_flag) information may indicate whether an Adaptive Loop Filter (ALF) is applicable to the pixel value of the current CTU.

When such coding decision information is shared between channels, images having excellent image quality may be obtained while image compressibility is increased.

Describing the coding decision information to be shared between channels according to the present embodiment, transform_skip_flag information may be used as an example of the coding decision information to be shared between channels, for convenience of the entire description and understanding of the embodiment, such as the description of operations, drawings, and equations.

However, the transform_skip_flag information is only a single example, and the coding decision information to be shared between channels to which the present embodiment is applied does not necessarily mean only the transform_skip_flag information.

For example, it should be understood that one or more of the above-described pieces of coding decision information, such as 1) rdpcm_flag information, 2) pieces of transform-related selection information such as mts_flag information, mts_idx information, nsst_flag information, and nsst_idx information, 3) obmc_flag information, and 4) PDPC_flag information, which are required for decoding, are included in the coding decision information to be shared between channels.

Also, when channels between which coding decision information required for decoding is to be shared according to the embodiment are described, a YCbCr color space may be used as an example. However, the YCbCr color space is only a single detailed example, and embodiments may be applied to various color spaces, such as a YUV color space, an XYZ color space, and an RGB color space.

A color index cIDX may be a channel index indicating one of channels in a color space.

For the YCbCr color space and the YUV color space, cIDX may have values such as "0/1/2" for channels sequentially displayed in the corresponding color space. The values "a/b/c" may represent that the value of cIDX indicating a first channel is 'a', the value of cIDX indicating a second channel is 'b', and the value of cIDX indicating a third channel is 'c'.

Alternatively, for the YCbCr color space and the YUV color space, cIDX may have values such as "0/2/1" for channels sequentially displayed in the corresponding color space.

For the RGB color space and the XYZ color space, cIDX may have values such as "1/0/2" or "2/0/1" for the channels sequentially displayed in the corresponding color space.

As image-compression technologies that have been developed or are being developed for the purpose of realizing high-efficiency image encoding/decoding, there may be various technologies, such as 1) inter-prediction technology of predicting the value of a pixel included in a target picture from a picture previous to or subsequent to the target picture, 2) intra-prediction technology of predicting the value of a pixel included in the current target picture using information of pixels in the target picture, 3) transform and quantization technology of compressing the energy of a residual signal remaining as a prediction error, 4) entropy-coding technology of assigning a short codeword to more frequently appearing values and assigns a long codeword to less frequently appearing values, and arithmetic coding technology. By utilizing these image-compression technologies, image data may be effectively compressed, transmitted, and stored.

There is a great variety of compression technologies that can be applied to encoding of images. Further, depending on the properties of the images to be encoded, a specific compression technology may be more profitable than other compression technologies. Therefore, an encoding apparatus 1600 may perform the most profitable compression on a target block by adaptively deciding whether to use any of various types of multiple compression technologies for the target block.

Therefore, in order to select the compression technology most profitable for the target block from among various selectable compression technologies, the encoding apparatus 1600 may typically perform Rate-Distortion Optimization (RDO). Which one of various image encoding decisions that can be selected for encoding of images is optimal may not be known in advance from the standpoint of rate-distortion. Therefore, the encoding apparatus 1600 may calculate rate-distortion values for combinations of all available image encoding decisions by performing encoding (or simplified encoding) on respective combinations of all available image encoding decisions, and may decide on and use an image encoding decision having the smallest rate-distortion value, among the calculated rate-distortion values, as the final image encoding decision for the target block.

Also, the encoding apparatus 1600 may record an encoding decision, derived by performing such RDO or derived using an additional decision method selected by the encoding apparatus 1600, in a bitstream. A decoding apparatus 1700 may read (i.e. parse) the encoding decision recorded in the bitstream, and may accurately perform decoding on the target block by performing a reverse process corresponding to encoding depending on the encoding decision.

Here, information indicating encoding decision may be referred to as "coding decision information" or "coding information" required for decoding.

Hereinafter, the terms "coding decision information" and "coding information" may have the same meaning, and may be used interchangeably with each other.

Generally, multiple channels for images (e.g. YUV, YCbCr, RGB, and XYZ) may not always have identical or similar properties. Therefore, from the standpoint of improvement of compressibility, making encoding decisions independently of each of multiple channels may generally realize better performance.

For example, as one of the above-described encoding decisions, there is transform_skip_flag, which is an encoding decision indicating whether to perform a transform on the target block. That is, whether a transform is to be skipped for each of blocks may be decided on, and transform_skip_flag information indicating such a decision may be recorded as coding decision information in a bitstream for each of multiple channels.

Generally, in encoding for image compression, it has been considered that a transform for a target block is always performed. However, when a spatial change in the values of pixels in a target block that is the target of compression is very large, or especially when a change in the pixel values is very locally limited, the extent to which image energy is concentrated on low frequencies may not be great even if a transform is applied, and instead, a larger number of transform coefficients for a high-frequency area having relatively large values may occur.

Therefore, when low-frequency signal components are mostly maintained and high-frequency signal components are eliminated by means of a transform and quantization process, or when a transform and quantization process for reducing the amount of data by applying strong quantization is applied, serious degradation of image quality may occur. In particular, when a spatial change in the values of pixels is very large or which a change in pixel values is concentrated on a very locally limited region, such degradation of image quality may be further increased.

In order to solve the above-described problems, a method for directly encoding the values of pixels in a spatial domain without a transform, instead of uniformly applying a transform to a target block, may be used. In accordance with this method, whether to perform a transform on each transform block may be decided on. By performing or skipping a transform based on such a decision, encoding of the transform block may be performed. In a bitstream, transform_skip_flag information, which is coding decision information indicating whether the performance of a transform is to be skipped, may be recorded.

For example, when the value of the transform_skip_flag information is 1, a transform may be skipped. When the value of the transform_skip_flag information is 0, a transform may be performed. The encoding apparatus 1600 may transfer information about whether a transform is to be skipped for the target block to the decoding apparatus 1700 through the transform_skip_flag information, and the above-described problems may be solved by means of this transfer.

Also, pieces of transform_skip_flag information may be respectively set for a luma channel (i.e. Y channel) and chroma channels (i.e. Cb channel and Cr channel), and may then be transmitted. The decoding apparatus 1700 may perform decoding on the target block by skipping or performing a transform on the channel of the target block depending on the value of the transform_skip_flag information for each channel, which is read (i.e., parsed) from the bitstream.

However, when pieces of transform_skip_flag information for channels such as Y, Cb, and Cr are transmitted for all transform blocks, additional problems may arise in that overhead may increase due to signaling of pieces of transform_skip_flag information, and the compressibility of images may be deteriorated.

In order to mitigate problems such as deterioration of compressibility, flag information indicating whether a transform is to be skipped may be limitedly transmitted only when the size of a transform block is less than or equal to a specific transform block size. However, even though this scheme is used, pieces of flag information indicating whether a transform is to be skipped for all channels must be transmitted for each transform block having a size greater than the specific block size, which may still deteriorate the compressibility of images. Also, such deteriorated compressibility inevitably decreases the quality of compressed images.

In order to solve the deterioration of compressibility caused by transmitting pieces of coding decision information, selected by the encoding apparatus 1600, for all channels, encoding and/or decoding methods that use the sharing of information between channels are disclosed in embodiments.

First, conditions according to which image properties of channels are determined to be similar to each other may be predefined. When these conditions are satisfied, coding decision information for an image or a block determined by the encoding apparatus 1600 for a representative one of multiple channels may be transmitted to the decoding apparatus 1700.

For all of the remaining channels other than the representative channel or a channel selected from among the remaining channels, among the multiple channels, coding decision information that is transferred for the representative channel may be shared and used. By means of this sharing and usage, the compressibility of images may be improved. Therefore, the encoding and/or decoding methods according to the present embodiment may provide excellent encoding efficiency even if respective pieces of coding decision information for multiple channels are not transmitted.

Here, the coding decision information to be shared may include one or more of the above-described transform_skip_flag information, intra-smoothing filtering information, rdpcm_flag information, mts_flag information, mts_idx information, PDPC_flag information, MTS_CU_flag information, MTS_Hor_flag information, MTS_Ver_flag information, nsst_flag information, nsst_idx information, CU skip flag information, CU_lic_flag information, obmc_flag information, codeAlfCtuEnable_flag information, and PDPC_flag information.

Conditions Under which Image Properties of Respective Channels are Determined to be Similar to Each Other In order to determine that the image properties of channels are similar to each other, whether cross-channel prediction (inter-channel prediction) has been used for a target block may be checked.

That is, in order to predict the decoding target channel of the target block, whether to use a prediction method for acquiring a prediction value for the decoding target channel by applying a specific model to the reconstructed information of an additional channel (e.g. a luma channel) may be checked. For example, the reconstructed information may be the pixel value of a reconstructed pixel or the value of a transformation coefficient. The specified model may be a linear model.

A decoding target channel may be the channel that is the target to be currently decoded, among multiple channels. An encoding target channel may be the channel that is the target to be currently encoded, among multiple channels. Hereinafter, the encoding target channel and/or the decoding target channel may be simply referred to as a "target channel".

For example, whether intra-prediction for the target block uses an intra-prediction mode that derives a prediction value for the target channel by utilizing reconstructed information of an additional channel may be checked.

In order to derive the prediction value for the target channel using the reconstructed information of an additional channel, a Cross-Component Linear Model (CCLM) that uses a single linear model, a Multi-Mode Linear Model (MMLM) that uses multiple linear models, and a multifilter linear model that uses multiple filters may be used. In the CCLM, the term "component" may be replaced with "channel".

The INTRA_CCLM mode may be an intra-prediction mode that uses a CCLM. The INTRA_MMLM mode may be an intra-prediction mode that uses an MMLM. The INTRA_MFLM mode may be an intra-prediction mode that uses an MFLM.

Alternatively, a determination that the image properties of channels are similar to each other may be implemented by checking whether the intra-prediction mode of the target block (e.g. intra_chroma_pred_mode information indicating an intra-prediction mode for the chroma channel of the target block) is one of an INTRA_CCLM mode, an INTRA_MMLM mode, and an INTRA_MFLM mode.

Alternatively, a determination that the image properties of channels are similar to each other may be implemented by checking whether the encoding mode of a target channel of the target block uses the encoding mode of an additional channel (e.g. a luma channel) without change. For example, a determination that the image properties of channels are similar to each other may be implemented by checking whether the intra-prediction mode of the target block (e.g. intra_chroma_pred_mode information) is a direct mode (DM). The direct mode may also be referred to as a "derived mode". DM may be a mode indicating that the intra-prediction mode of a luma channel is used as the intra-prediction mode of a chroma channel without change due to the characteristic whereby the correlation between the luma channel and the chroma channel may be higher.

The features of the DM, which is one of intra-prediction modes and the detailed operation thereof may be defined in greater detail with reference to the following Table 10 and Table 11.

Table 10 shows a method for setting an IntraPredModeC value for intra-prediction of a chroma signal (when the value of sps_cclm_enabled_flag information is 0).

Table 11 shows a method for setting an IntraPredModeC value for intra-prediction of a chroma signal (when the value of sps_cclm_enabled_flag information is 1).

TABLE 10

| | IntraPredModeY | | | | |
|---|---|---|---|---|---|
| intra_chroma_pred_mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 11

| | IntraPredModeY | | | | |
|---|---|---|---|---|---|
| intra_chroma_pred_mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 77 | 77 | 77 | 77 | 77 |
| 5 | 0 | 50 | 18 | 1 | X |

Generally, in intra-prediction, it may be determined whether to use an INTRA_Cross-Component Linear Model (CCLM) mode, an INTRA_Multi-Model LM (MMLM) mode or an INTRA_Multi-Filter LM (MFLM) mode in which the pixel value of a reconstructed pixel for a single channel (e.g. a luma channel, or more generally, a representative channel) is used to calculate a prediction value for an additional channel (e.g. a chroma channel, or more generally, a target channel).

Indication of the case where the INTRA_CCLM mode, the INTRA_MMLM mode or the INTRA_MFLM mode is used may be classified into two types and defined in detail depending on the value of sps_cclm_enabled_flag information, as shown in Table 10 and Table 11.

The sps_cclm_enabled_flag information may be information indicating whether the INTRA_CCLM mode, the INTRA_MMLM mode, and the INTRA_MFLM mode are to be enabled. Alternatively, the sps_cclm_enabled_flag information may be information indicating whether the INTRA_CCLM mode, the INTRA_MMLM mode, and the INTRA_MFLM mode have been enabled.

When the value of the sps_cclm_enabled_flag is 0, INTRA_CCLM mode, the INTRA_MMLM mode, and the INTRA_MFLM mode may not be used, whereas when the value of the sps_cclm_enabled_flag is 1, the INTRA_CCLM mode may be used. Alternatively, when the value of the sps_cclm_enabled_flag is 1, at least one of the INTRA_MMLM mode and the INTRA_MFLM mode may be used.

Whether the intra-prediction mode (e.g. intra_chroma_pred_mode information) of the target channel is a DM may be determined by checking whether the intra-prediction mode (i.e., the value of the intra_chroma_pred_mode) of the chroma channel is a specific value (e.g. 4 in Table 10 and 5 in Table 11). In the description of this operation, when the value of the sps_cclm_enabled_flag is 0, Table 10 may be referred to, whereas when the value of the sps_cclm_enabled_flag is 1, Table 11 may be referred to.

When the value of the sps_cclm_enabled_flag is 0 and the value of the intra-prediction mode (e.g., intra_chroma_pred_mode) of the target channel is 4, it may be considered that the DM is applied. Alternatively, when the value of the sps_cclm_enabled_flag is 1 and the value of the intra-prediction mode (e.g., intra_chroma_pred_mode) of the target channel is 5, it may be considered that the DM is applied. For intra-prediction of the target channel (e.g. a chroma channel) of the target block indicated by the DM, the value of IntraPredModeY, indicating the intra-prediction mode of a representative channel (e.g. a luma channel), may be used as the value of IntraPredModeC without change.

Here, the intra-prediction mode intra_chroma_pred_mode of the chroma signal may be index information indicating which type of intra-prediction is to be used for the chroma signal.

By means of this index information, the final value indicating the intra-prediction mode that is actually used for intra-prediction of the chroma signal may be the value of IntraPredModeC. In other words, IntraPredModeC may indicate the intra-prediction mode that is actually used for intra-prediction of the chroma signal.

When the value of sps_cclm_enabled_flag is 0 and the DM is applied (i.e. the value of the intra_chroma_pred_mode is 4), if the value of IntraPredModeY is 0, 50, 18 or 1, the value of IntraPredModeC may also be 0, 50, 18 or 1.

Here, a value of 0 may mean a planar mode (i.e. planar prediction or planar direction), a value of 1 may mean a DC mode, a value of 18 may mean a horizontal mode, a value of 50 may mean a vertical mode, and a value of 66 may mean a diagonal mode.

When the value of IntraPredModeY is an additional value X different from any of the four values 0, 50, 18, and 1, the value of IntraPredModeC at that time may also be X, equal to the value of IntraPredModeY.

Meanwhile, when the value of cclm_enabled_flag is 0, if the value of IntraPredModeY is 0, 50, 18 or 1, the value of IntraPredModeC may be decided on depending on the value of IntraPredModeY, as shown in the first four rows in Table 10.

For example, as described in the first row in Table 10, when the value of IntraPredModeY is 0, 50, 18 or 1, the value of IntraPredModeC may be 66, 0, 0 or 0. When the value of IntraPredModeY is an additional value other than 0, 50, 18, and 1, the value of IntraPredModeC may be 0.

Further, when the value of sps_cclm_enabled_flag is 1 and the DM is applied (i.e. the value of the intra_chroma_pred_mode is 5), if the value of IntraPredModeY is 0, 50, 18 or 1, the value of IntraPredModeC may also be 0, 50, 18 or 1.

Here, a value of 0 may mean a planar mode (i.e. planar prediction or planar direction), a value of 1 may mean a DC mode, a value of 18 may mean a horizontal mode, a value of 50 may mean a vertical mode, and a value of 66 may mean a diagonal mode.

When the value of IntraPredModeY is an additional value X different from any of the four values 0, 50, 18, and 1, the value of IntraPredModeC at that time may also be X, equal to the value of IntraPredModeY.

Meanwhile, when the value of cclm_enabled_flag is 1, if the value of IntraPredModeY is 0, 50, 18 or 1, the value of IntraPredModeC may be decided on depending on the value of IntraPredModeY, as shown in the first five rows in Table 11.

For example, as described in the first row in Table 11, when the value of IntraPredModeY is 0, 50, 18 or 1, the value of IntraPredModeC may be 66, 0, 0 or 0. When the value of IntraPredModeY is an additional value other than 0, 50, 18, and 1, the value of IntraPredModeC may be 0.

In a further embodiment, determination that the image properties of channels are similar to each other may be implemented by checking whether, as an encoding mode for the target channel of the target block, a mode, indicating that only a specific mode limited by the encoding mode of an additional channel (e.g. a luma channel) is to be used, is used. For example, a determination that the image properties of channels are similar to each other may be made by checking whether the intra-prediction mode of the target channel is a Direct Mode (DM).

Cross-Channel Prediction Using Correlation Between Channels

Cross-channel prediction may be technology that uses the pixel value of a pixel in an additional channel rather than using intra-prediction or inter-prediction when predicting the pixel value of a pixel in a target channel.

When a target block is encoded, the fact that the performance of cross-channel prediction is better than that of other types of prediction may mean that considerable similarity is present between the pixel values of pixels in the channels of the target block.

Therefore, in this case, when the value of coding decision information of a representative channel is determined, it may be profitable to equally use the determined value of the coding decision information of the representative channel for the coding decision information of an additional channel or to use a specific value indicated by the value of the coding decision information of the representative channel for the coding decision information of the additional channel.

For example, when the value of transform_skip_flag information of the representative channel is 0, indicating that a transform is not skipped, the probability that the determined value of transform_skip_flag information will be '0' may be high even in other channels.

Therefore, for an image or a block for which cross-channel prediction is effective, there may occur the case where there is no need to individually designate pieces of transform_skip_flag information for multiple channels. The reason for this is that the similarity between channels is high, and thus the probability that pieces of transform_skip_flag information of respective channels will be identical to each other may be high.

Although such image properties are present, compressibility and image quality may be deteriorated when pieces of transform_skip_flag information are respectively transmitted for channels of the image.

This principle may also be applied to additional coding decision information, that is, mts_flag information, mts_idx information, nsst_flag information, nsst_idx information, intra-smoothing filtering information, PDPC_flag information, and rdpcm_flag information, and the probability that the value of coding decision information for the representative channel will be identical to that of the coding decision information for an additional channel may be high.

Therefore, based on the conditions under which the image properties of the channels are determined to be similar to each other, whether cross-channel prediction using a correlation between channels has been decided on as the encoding mode of the target block may be determined.

For example, the determination of whether cross-channel prediction has been decided on as the encoding mode of the target block may be intended to determine whether the image properties of channels are similar to each other depending on whether a Color-Component Linear prediction Mode (CCLM), indicating cross-channel prediction is applied to the target block. In order to determine whether the CCLM is applied to the target block, whether the prediction mode of the target block is one of an INTRA_CCLM mode, an INTRA_MMLM mode, and an INTRA_MFLM mode may be checked.

For example, the determination of whether the cross-channel prediction has been decided on as the encoding mode of the target block may be intended to determine whether the intra mode of the representative channel (e.g. a luma channel) is used for an additional channel (e.g. chroma channels Cb and Cr) without change. Alternatively, the determination of whether cross-channel prediction has been decided on as the encoding mode of the target block may be intended to determine whether a specific intra mode, indicated by the intra mode of the representative channel, is used in an additional channel. Alternatively, the determination of whether cross-channel prediction has been decided on as the encoding mode of the target block may be intended to determine whether a specific intra mode, derived from the intra mode of the representative channel, is used for an additional channel.

For example, the determination of whether cross-channel prediction has been decided on as the encoding mode of the target block may be intended to determine whether the encoding apparatus 1600 and the decoding apparatus 1700 use a specific encoding mode (e.g. an inter-channel sharing mode) in agreement with each other.

For example, the determination of whether cross-channel prediction has been decided on as the encoding mode of the target block may be intended to determine whether the intra-prediction mode of a chroma channel is a DM.

Such a DM may be a mode indicating that, due to the characteristic in which the correlation between a luma channel and chroma channels may be high, the intra-prediction mode of the chroma channels is used as the intra-prediction mode of the luma channel without change. Therefore, when the intra-prediction mode of the chroma channels of the target block is a DM, it may be determined that the conditions under which the image properties of channels are determined to be similar to each other are satisfied.

In addition to the conditions described in the above examples, whether cross-channel prediction has been decided on as the encoding mode of the target block may be determined based on the size of a block.

For example, the greater the size of the block, the higher the probability that a pixel having a heterogeneous property will be present in the corresponding block. Therefore, the similarity between the channels of the block having a larger size may be less than that of a block having a smaller size. Also, when the size of a block is excessively small, the similarity between channels of the block may not be stable.

For example, the sharing of information between channels may be performed only for a block having a size that is less than or equal to a specific size. The specific size may be 64×64, 32×32 or 16×16. When the block size is less than or equal to the specific size, the sharing of information between channels is performed, and thus the conditions under which the image properties of channels are determined to be similar to each other may be more reliably satisfied.

Alternatively, the sharing of information between channels may be performed only for a block having a size greater than a specific size. The specific size may be 4×4. When the size of the block is greater than the specific size, the sharing of information between channels is performed, and thus the conditions under which the image properties of channels are determined to be similar to each other may be more reliably satisfied.

Alternatively, only when the size of a block is greater than a first specific size (e.g. 4×4) and is less than or equal to a second specific size (e.g. 32×32 or 64×64) may the sharing of information between channels be performed. Only when the size of the block falls within a specific range, may the sharing of information between channels be performed, and thus the conditions under which the image properties of channels are determined to be similar to each other may be more reliably satisfied.

In an embodiment, a method and apparatus for encoding a target block through the sharing of information between channels will be described below, and the following functions may be provided.

Coding decision information of one channel of a target block may be parsed from a compressed bitstream, and decoding for all channels or some selected channels of the target block may be performed using the coding decision information of the one channel.

A bitstream may be configured such that coding decision information is transmitted only for a representative channel or some selected channels of the target block.

Whether a transform is to be skipped for one channel may be determined, and the determination of whether a transform is to be skipped may be applied to additional channels.

For one channel of a transform block, transform_skip_ flag information may be parsed from the compressed bitstream. Whether a transform is to be skipped may be determined for one channel or multiple channels of the transform block by utilizing the parsed transform_skip_ flag information.

For one channel of the transform block, the transform_skip_flag information may be signaled. The transform_skip_flag information for one channel may be used even for additional channels.

Coding decision information may be efficiently signaled through the sharing of information between channels. By means of this efficient signaling, encoding efficiency and subjective image quality may be improved.

In particular, when a spatial change in pixel values in a block is very large or very sharp, the extent to which image energy is concentrated on low frequencies may not be large even if a transform is applied to the target block. Also, when low-frequency signal components are mostly maintained and high-frequency signal components are eliminated by applying a transform and quantization process to such a block, or w % ben strong quantization is applied to such a block, serious degradation of image quality may occur. In an embodiment, whether a transform for a block is to be skipped may be economically indicated based on the determination by the encoding apparatus 1600 without causing large overhead. Through such economical indication, the compressibility of images may be improved, and the deterioration of image quality may be minimized.

When cross-channel prediction technology that uses a correlation between the channels is used, multiple pieces of coding decision information may not be respectively used for multiple channels. In an embodiment, coding decision information may be transmitted for one channel, and the coding decision information transmitted for the one channel may be shared and used with all of the remaining channels or some channels selected from among the remaining channels. By means of this sharing, the problem of the deterioration of compressibility and image quality may be solved.

Decision of Representative Channel Depending on Color Space

As color spaces for image encoding and decoding, there are YCbCr and YUV spaces, which are used for encoding and decoding of a general image, and in addition, RGB, XYZ, and YCoCg spaces are present. When one of various color spaces is a target color space that is used for encoding and decoding of an image, one of the channels of the target color space may be decided on as a representative channel of the target color space.

In an embodiment, the color channel having the highest correlation with a luma signal, among the channels, may be decided on as the representative channel. For example, in an RGB color space, a G channel may have the highest correlation with the luma signal, and thus the G channel may be selected as the representative channel. In an XYZ color space, a Y channel may have the highest correlation with the luma signal, and thus the Y channel may be selected as the representative channel. In a YCoCg color space, a Y channel may have the highest correlation with the luma signal, and thus the Y channel may be selected as the representative channel.

The channels in the color space may be represented by index values such as "0/1/2". SelectedCIDX may be the index of a selected color. Alternatively, SelectedCIDX may be an index value indicating the selected representative channel. The representative channel may be decided on by the index SelectedCIDX indicating a selected representative channel, among pieces of information about a target block in a bitstream.

For example, in a YCbCr color space, the value of SelectedCIDX may be 0, indicating a Y channel.

For example, in the YCbCr color space, a Cb channel may be decided on as the representative channel. When the Cb channel is decided on as the representative channel, the value of SelectedCIDX may be 1, indicating the Cb channel.

For example, in a YUV color space, a U channel may be decided on as the representative channel. When the U channel is decided on as the representative channel, the value of SelectedCIDX may be 1, indicating the U channel.

For the sharing of the coding decision information between channels, a specific channel in the color space may be selected as a representative channel. In the encoding and decoding of an image, the coding decision information of the representative channel may be shared between one or more remaining channels.

For example, the encoding apparatus 1600 may signal only the coding decision information of the representative channel to the decoding apparatus 1700 through a bitstream. Alternatively, the decoding apparatus 1700 may derive the coding decision information of the representative channel using the bitstream. The coding decision information of at least some of the remaining channels may not be separately signaled. The decoding apparatus 1700 may derive the coding decision information of at least some of the remaining channels using the coding decision information of the representative channel. In other words, the coding decision information of the representative channel may be shared with at least some of the remaining channels.

For example, when the Y channel, having the highest correlation with the luma signal, is selected as the representative channel in the YCbCr color space, a correlation may be present between a luma channel (i.e. Y) and a chroma channel (i.e. Cb and/or Cr). Therefore, when prediction is performed for image compression, coding decision information for the luma channel, which is the representative channel, may be implicitly shared as pieces of coding decision information for one or more chroma blocks, instead of respectively applying independent predictions to three channels in the color space. The one or more chroma blocks may include one or more of a Cb block and a Cr block.

For example, when the Cb channel is selected as the representative channel in the YCbCr color space, a correlation may be present between a Cb signal and a Cr signal constituting the chroma channels. Therefore, when prediction is performed for image compression, coding decision information for the Cb channel, which is the representative channel, may be implicitly shared as coding decision information for the Cr block, instead of respectively applying independent predictions to two chroma channels.

Coding Decision Information Shared Between Channels

The coding decision information that can be shared between channels may be information, such as a syntax element, which is encoded by the encoding apparatus 1600 and which is signaled to the decoding apparatus 1700 as information contained in a bitstream. For example, the coding decision information may include a flag, an index, etc. Also, the coding decision information may include information derived during an encoding and/or decoding process. Further, the coding decision information may mean information required for encoding and/or decoding an image.

For example, the coding decision information may include at least one or combinations of the size of a unit/block, the depth of the unit/block, the partition information of the unit/block, the partition structure of the unit/block, partition flag information indicating whether the unit/block is partitioned in the form of a quad tree, partition flag information indicating whether the unit/block is partitioned in the form of a binary tree, the partitioning direction of a binary tree form (horizontal direction or vertical direction), the partitioning form of a binary tree form (symmetrical partitioning or asymmetrical partitioning), partition flag information indicating whether the unit/block is partitioned in the form of a tertiary tree, the partitioning direction of the tertiary tree form (horizontal direction or vertical direction), the partitioning form of the tertiary tree form (symmetrical partitioning or asymmetrical partitioning), information indicating whether the unit/block is partitioned in the form of a complex tree, the combination and direction of partitioning of a complex tree form (horizontal direction or vertical direction), a prediction scheme (intra-prediction or inter-prediction), an intra-prediction mode/direction, a reference sample filtering method, a prediction block filtering method, a prediction-block boundary filtering method, the filter tap of filtering, the filter coefficient of filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the filter tap of the interpolation filter, the filter coefficient of the interpolation filter, the magnitude of a motion vector, precision of representation of a motion vector, a transform type, a transform size, information indicating whether a primary transform is used, information indicating whether an additional (secondary) transform is used, primary transform selection information (or a primary transform index), secondary transform selection information (or a secondary transform index), information indicating the presence or absence of a residual signal, a coded block pattern, a coded block flag, a quantization parameter, a quantization matrix, information about an intra-loop filter, information about whether an intra-loop filter is applied, the coefficient of the intra-loop filter, the filter tap of the intra-loop filter, the shape/form of the intra-loop filter, information indicating whether a deblocking filter is applied, the coefficient of the deblocking filter, the tap of the deblocking filter, the strength of the deblocking filter, the shape/form of the deblocking filter, information indicating whether an adaptive sample offset is applied, information indicating whether an adaptive sample offset is applied, the value of an adaptive sample offset, the category of the adaptive sample offset, the type of the adaptive sample offset, information indicating whether an adaptive in-loop filter is applied, the coefficient of the adaptive in-loop filter, the tap of the adaptive in-loop filter, the shape/form of the adaptive in-loop filter, a binarization/debinarization method, a context model, a context model decision method, a context model update method, information indicating whether a regular mode is performed, information indicating whether a bypass mode is performed, a context bin, a bypass bin, a transform coefficient, a transform coefficient level, a transform coefficient level scanning method, an image display/output sequence, slice identification information, a slice type, slice partition information, tile identification information, tile type information, tile partition information, a picture type, bit depth, information about a luma signal and information about a chroma signal, transform_skip_flag information, primary transform selection information, secondary transform selection information, reference sample filtering information, PDPC_flag information, rdpcm_flag information, EMT flag information, mts_flag information, mts_idx information, nsst_flag information, and nsst_idx information.

Among pieces of coding decision information that can be shared between channels, primary transform selection information may be transform information required in order to perform a transform procedure on a residual signal using a combination of one or more DCT transform kernels and/or DST transform kernels related to a horizontal direction and/or a vertical direction. For example, the primary transform selection information may be information required in order to use MTS in the primary transform. The primary transform selection information may include mts_flag information and mts_idx information.

The primary transform selection information applied to the target block may be explicitly signaled, or alternatively may be implicitly derived by the encoding apparatus 1600 and the decoding apparatus 1700 using the coding decision information of the target block and the coding decision information of a neighbor block.

After the primary transform has been completed in the encoding apparatus 1600, a secondary transform may be performed so as to improve the energy concentration of transform coefficients.

The secondary transform selection information that is applied to the target block may be explicitly signaled, or alternatively may be implicitly derived by the encoding apparatus 160W and the decoding apparatus 1700 using the code decision information of the target block and the coding decision information of a neighbor block. The decoding apparatus 1700 may perform a secondary inverse transform depending on whether the secondary inverse transform is to be performed, and may perform a primary inverse transform on the results of performing the secondary inverse transform depending on whether a primary inverse transform is to be performed.

The encoding apparatus 1600 may generate rdpcm_flag information for the target block, and may record the rdpcm_flag information in a bitstream. The decoding apparatus 1700 may acquire the rdpcm_flag information through the bitstream, and may perform RDPCM depending on information indicated by the rdpcm_flag information, or may not perform RDPCM.

Figure 18:
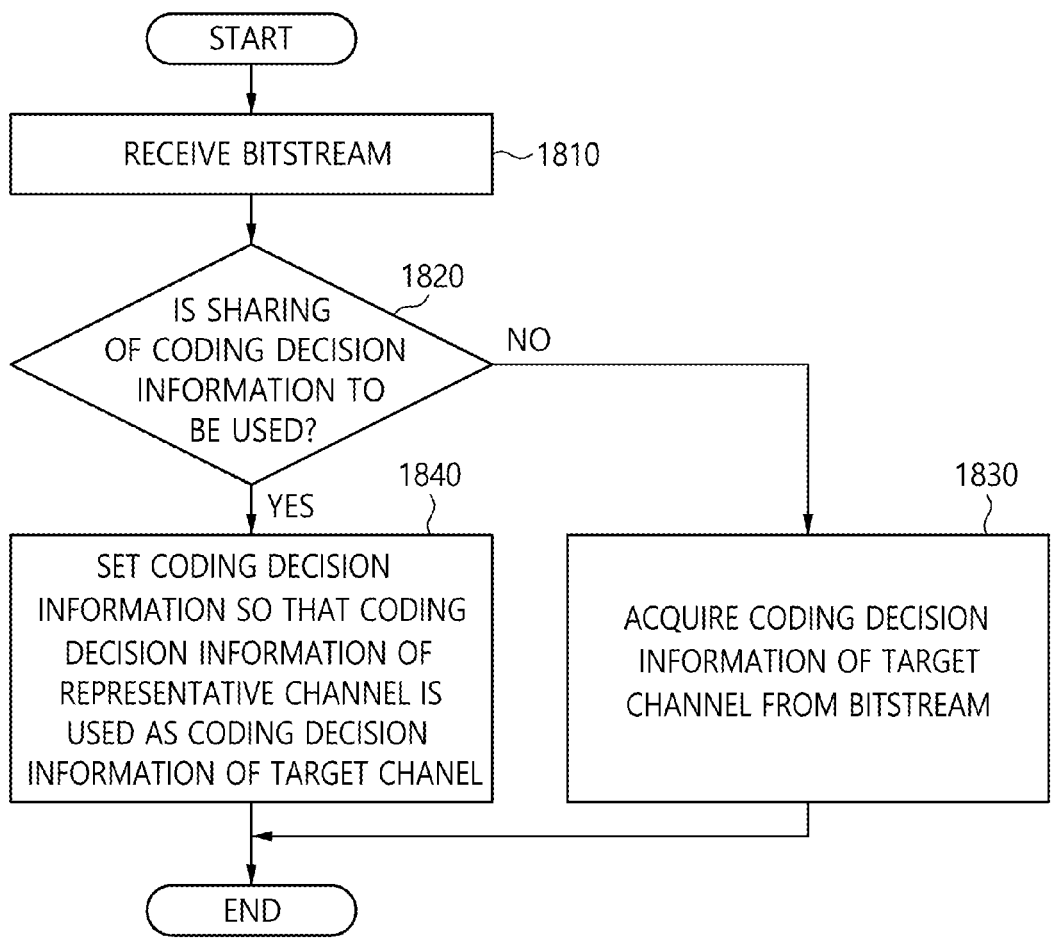
FIG. 18 is a flowchart of a method for decoding coding decision information according to an embodiment.

FIG. 18 is a flowchart of a method for decoding coding decision information according to an embodiment.

In accordance with embodiments, when a specific channel in a color space is selected as a representative channel so as to share information between multiple channels, the coding decision information of the representative channel of the target block may be shared by one or more remaining channels other than the representative channel, among the multiple channels.

For example, when intra-prediction for the target block is performed in a YCbCr color space, a Y channel may be set as a representative channel, and thereafter the intra-coding decision information of the representative channel may be shared and used to perform decoding of channels other than the representative channel (i.e. a Cb channel and/or a Cr channel), instead of respectively, independently transmitting pieces of intra-coding decision information for three channels in the color space. Alternatively, after the Cb channel is assumed to be a representative channel in the YCbCr color space, the intra-coding decision information of the representative channel may be implicitly used for the decoding of the Cr channel, which is a channel other than the representative channel.

For example, the intra-coding decision information of the representative channel that can be shared by the remaining channels may include one or more of an intra-prediction mode, an intra-prediction direction, a prediction-block boundary filtering method, a filter tap for prediction-block boundary filtering, a filter coefficient for prediction-block boundary filtering, transform_skip_flag information, primary transform selection information, secondary transform selection information, mts_flag information, mts_idx information, PDPC_flag information, rdpcm_flag information, EMT flag information, nsst_flag information, nsst_idx information, intra-smoothing filtering information, CU skip flag information, CU_lic flag information, obmc_flag information, codeAlfCtuEnable_flag information, and PDPC_flag information.

The case where cross-channel prediction is selected from among various technologies including angular prediction, DC prediction, planar prediction, etc. for predicting a chroma signal or where cross-channel prediction is more profitable may mean that the properties of a luma signal (i.e. a Y signal) are considerably similar to those of a chroma signal (i.e. Cb and/or Cr signals).

In this case, when the channel of a Y signal block is a representative channel, coding decision information, determined in the process of encoding and/or decoding the representative channel, may be equally applied to a chroma block. By means of this application, the number of bits required in order to transmit the coding decision information may be reduced. Therefore, encoding and decoding may be performed so that a single piece of coding decision information is used for multiple channels via cross-channel prediction.

For example, after the coding decision information for a luma channel has been determined, the determined coding decision information may be shared between the remaining channels, and encoding may be performed based on the shared coding decision information. Alternatively, pieces of coding decision information may be independently applied to three channels without being shared between the channels, and the three channels may be independently encoded and/or decoded. The encoding apparatus 1600 may decide on a method that is profitable from the standpoint of rate-distortion, among methods for sharing coding decision information between the channels and methods for independently encoding the channels, as an encoding method. Depending on this decision, the encoding apparatus 1600 may explicitly write information about whether coding decision information is shared between channels in a bitstream, and this information may be transmitted to the decoding apparatus 1700 through the bitstream.

For example, when a specific encoding condition is satisfied in the encoding and/or decoding process, the information about whether coding decision information is shared between channels may not be explicitly signaled, and the coding decision information of a representative channel may be shared by the remaining channels.

For example, the specific encoding condition may be a condition indicating whether Cross-Component Prediction (CCP), a DM or a Cross-Component Linear Model (CCLM) is used.

For example, when the remaining chroma signal (i.e. a Cb signal and/or a Cr signal) is predicted using at least one of an original signal, a reconstructed signal, a residual signal, and a prediction signal of the luma signal for which encoding or decoding has been completed, the sharing of coding decision information between channels may be applied.

For example, when a luma signal is predicted using at least one of an original signal, a reconstructed signal, a residual signal, and a prediction signal of the chroma signal for which encoding or decoding has been completed, the sharing of coding decision information between channels may be applied.

For example, when a Cr signal is predicted using at least one of an original signal, a reconstructed signal, a residual signal, and a prediction signal of a Cb signal for which encoding or decoding has been completed, the sharing of coding decision information between channels may be applied.

For example, when a Cb signal is predicted using at least one of an original signal, a reconstructed signal, a residual signal, and a prediction signal of the Cr signal for which encoding or decoding has been completed, the sharing of coding decision information between channels may be applied.

When the luma channel is set as a representative channel in a YCbCr color space, coding decision information may be signaled only for the luma signal, and coding decision information may not be separately transmitted for the remaining chroma channels, instead of being signaled to the remaining channels other than the luma channel. Through such selective transmission, compressibility may be improved.

Further, coding decision information may be transmitted only for the Cb signal and the transmitted coding decision information may be shared for the Cr signal, and thus compressibility may be improved. Alternatively, coding decision information may be transmitted only for the Cr signal and the transmitted coding decision information may be shared for the Cb signal, and thus compressibility may be improved.

At step 1810, a communication unit 1720 may receive a bitstream. The bitstream may include coding decision information.

At step 1820, a processing unit 1710 may determine whether the sharing of coding decision information is to be used for a target channel of a target block.

When coding decision information is not to be shared, step 1830 may be performed.

When coding decision information is to be shared, step 1840 may be performed.

At step 1830, the processing unit 1710 may acquire the coding decision information of the target channel from the bitstream. The processing unit 1710 may parse and read the coding decision information of the target channel from the bitstream.

At step 1840, the processing unit 1710 may set the coding decision information so that the coding decision information of the representative channel is used as the coding decision information of the target channel.

Steps 1820, 1830, and 1840 may be represented by the following Code 1.

[Code 1]

```
if ((cIdx != 0) && "cross-channel prediction is used")
    coding decision information [cIdx] = coding decision information[0]
else
    PARSE coding decision information [cIdx] from compressed bitstream
``` cIdx may indicate the target channel of the target block. For example, when the number of channels in a target image is 3, cIdx may be one of predefined specific values, and may be one of {0, 1, 2}.

In an embodiment, the cIdx of the representative channel may be assumed to be 0.

"cIdx !=0" may indicate that the target channel is not a representative channel (e.g. a luma channel). In other words, a cIdx value of "0" may indicate that the target channel is a representative channel.

In other words, at step 1820, when the target channel is not a representative channel and cross-channel prediction is used for the target block, the processing unit 1710 may determine to use the sharing of coding decision information for the target channel. When the target channel is a representative channel or when cross-channel prediction is not used for the target block, the processing unit 1710 may determine not to use the sharing of coding decision information for the target channel.

Whether cross-channel prediction is used for the target block may be 1) derived based on information acquired from the bitstream and 2) implicitly derived depending on whether a specific condition is satisfied.

As described above, whether cross-channel prediction is used may be determined based on the intra-prediction mode of the target block. Whether cross-channel prediction is used may be determined based on whether the intra-prediction mode of the target block is one of an INTRA_CCLM mode, an INTRA_MMLM mode, and an INTRA_MFLM mode. For example, the processing unit 1710 may determine that cross-channel prediction is used when the intra-prediction mode of the target block is one of the INTRA_CCLM mode, the INTRA_MMLM mode, and the INTRA_MFLM mode.

As described above, whether cross-channel prediction is used may be determined based on whether the intra-prediction mode of the chroma channel of the target block has a specific value. For example, when the intra-prediction mode of the chroma channel of the target block has a specific value, the processing unit 1710 may determine that cross-channel prediction is used.

The intra-prediction mode of the chroma channel of the target block may be indicated by intra_chroma_pred_mode information.

As described above, whether cross-channel prediction is used may be determined based on whether the intra-prediction mode of the target channel is a DM. For example, when the intra-prediction mode of the target channel is a DM, the processing unit 1710 may determine that cross-channel prediction is used.

At step 1830, the processing unit 1710 may acquire the coding decision information of a block of the channel indicated by cIdx from the bitstream.

The processing unit 1710 may parse and read the coding decision information of the block of the channel indicated by cIdx from the bitstream.

At step 1840, the processing unit 1710 may share the coding decision information of the representative channel as coding decision information of the block of the channel indicated by cIdx. In other words, the processing unit 1710 may set the coding decision information of the representative channel as coding decision information of the block of the channel indicated by cIdx.

In accordance with an embodiment, an operation corresponding to a condition or an execution may be additionally performed before step 1820 or between steps 1820 and 1840.

In accordance with an embodiment, for a Cb signal, coding decision information may be transmitted, and for a Cr signal, the coding decision information of the Cb signal may be shared without transmission of coding decision information. In this case, the above-described code 1 may be modified to the following Code 2:

[Code 2]

```
if ((cIdx != 0) && "cross-channel prediction is used")
    coding decision information [cIdx] = coding decision information[0]
else
    PARSE coding decision information [cIdx] from compressed bitstream
```

Figure 19:
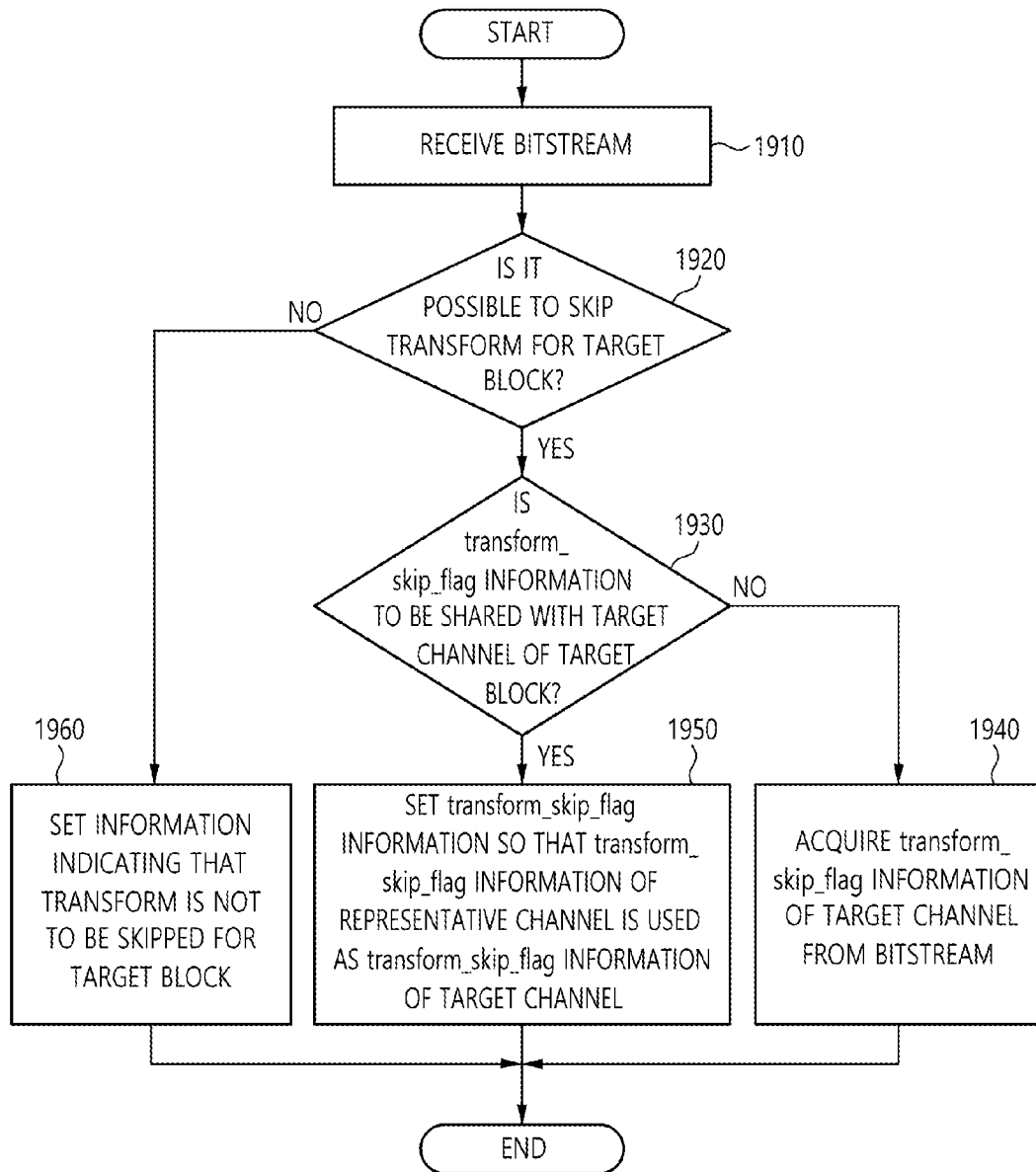
FIG. 19 is a flowchart of a decoding method for determining whether a transform is to be skipped according to an embodiment.

FIG. 19 is a flowchart of a decoding method for determining whether a transform is to be skipped according to an embodiment.

An encoding apparatus 1600 may determine whether a transform (e.g. a primary transform and/or a secondary transform) is to be skipped depending on the size of a target block.

The target block may be a transform block.

log 2TrafoSize may denote the size of the target block.

For example, the encoding apparatus 1600 may skip the transform of the target block when the size of the target block is less than or equal to a threshold value indicating the boundary value of a block size.

Log 2MaxTransformSkipSize may denote a threshold value indicating the boundary value of the block size.

When the transform of the target block is skipped, the encoding apparatus 1600 may set the value of transform_skip_flag information to 1 without performing a transform. The transform_skip_flag information may be transmitted to the decoding apparatus 1700 through a bitstream.

Also, when the transform of the target block is performed, the encoding apparatus 1600 may perform a transform, and may set the value of the transform_skip_flag information to 0. The transform_skip_flag information may be transmitted to the decoding apparatus 1700 through the bitstream.

Here, pieces of transform_skip_flag information may be separately transmitted for channels constituting the color space of an image.

The decoding apparatus 1700 may acquire the value of the transform_skip_flag information from the bitstream. In other words, the decoding apparatus 1700 may parse and read the transform_skip_flag information from the bitstream.

Here, the decoding apparatus 1700 may acquire the value of the transform_skip_flag information from the bitstream only when the size of a block is less than or equal to the threshold value indicating the boundary value of the block size.

Also, the decoding apparatus 1700 may acquire pieces of transform_skip_flag information for multiple channels of an image.

The acquisition of the transform_skip_flag information may be represented by the following Code 3:

[Code 3]

```
If ( log2TrafoSize <= Log2MaxTransformSkipSize )
    transform_skip_flag[ x0 ][ y0 ][ cIdx ]
``` x0 and y0 may denote spatial coordinates indicating the location of the target block.

cIdx may indicate the target channel of target block information.

When there are three image channels, cIdx may have one of the predefined values {0, 1, 2}. The value of a representative channel may be 0.

Code 3 may be modified to the following Code 4:

---
[Code 4]

If (( log2TbWidth <= Log2MaxTransformSkipSize_W ) && ( log2TbHeight <= Log2MaxTransformSkipSize_H ))
  transform_skip_flag[ x0 ][ y0 ][ cIdx ]

--- log 2TbWidth may be a value based on the following Equation 11. "width" may be the width of the target block (i.e. horizontal length thereof).

$$\log 2TbWidth = \log_2 width \quad \text{[Equation 11]}$$

log 2TbHeight may have a value based on the following Equation 12. "height" may be the height of the target block (i.e. the vertical length thereof).

$$\log 2TbHeight = \log_2 height \quad \text{[Equation 12]}$$

Predefined threshold values Log 2MaxTransformSkipSize_W and Log 2MaxTransformSkipSize_H may be equal to each other or may be different from each other. For example, the value of Log 2MaxTransformSkipSize_W may be 2, and the value of Log 2MaxTransformSkipSize_H may be 2.

Code 3 may be modified to the following Code 5:

---
[Code 5]

If (( log2TbWidth <= 2 ) && ( log2TbHeight <= 2 ))
  transform_skip_find[ x0 ][ y0 ][ cIdx ]

---

As described above, instead of pieces of transform_skip_flag information being separately signaled for multiple channels, transform_skip_flag information may be signaled only for a luma (Y) signal, and transform_skip_flag information may not be separately signaled for the remaining chroma channels. Alternatively, transform_skip_flag information may be signaled only for the Cb signal, and may not be separately signaled for the Cr signal, and the transform_skip_flag information transmitted for the Cb signal may be shared for the Cr signal.

Below, an embodiment in which the transform_skip_flag information is shared will be described.

In the embodiment, the decoding apparatus 1700 may acquire the transform_skip_flag information from a bitstream. This acquisition may be represented by the following Code 6:

---
[Code 6]

if ( log2TrafoSize <= Log2MaxTransformSkipSize ) {
 if ( (cIdx != 0) && "cross-channel prediction is used")
  transform_skip_flag[ x0 ][ y0 ][cIdx] = transform_skip_flag[ x0 ][ y0 ][0]
 else
  PARSE transform_skip_flag[ x0 ][ y0 ][cIdx] from compressed bitstream
} else
 transform_skip_flag[ x0 ][ y0 ][cIdx] = 0

--- x0 and y0 may be spatial coordinates indicating the location of a target block.

cIdx may indicate the target channel of the target block.

In Code 6 and other codes including the condition "if (log 2TrafoSize<=Log 2MaxTransformSkipSize)", the condition "if (log 2TrafoSize<=Log 2MaxTransformSkipSize)" may be replaced with the condition "if ((log 2TbWidth<=Log 2MaxTransformSkipSize_W) && (log 2TbHeight<=Log 2MaxTransformSkipSize_H))" or the condition "if ((log 2TbWidth<=2) && (log 2TbHeight<=2))".

When the number of channels of the image is 3, cIdx may have one of the predefined values {0, 1, 2}. The value of the representative channel may be 0. Alternatively, the value of the representative channel may be 1 or 2.

At step 1910, a communication unit 1720 may receive a bitstream.

At step 1920, the processing unit 1710 may determine whether it is possible to skip a transform for the target block.

If it is determined that it is possible to skip a transform, step 1930 may be performed.

If it is determined that it is not possible to skip a transform, step 1960 may be performed.

For example, when that the size of the target block is less than or equal to a specific size, the processing unit 1710 may determine that it is not possible to skip a transform.

For example, when the size of the target block is greater than the specific size, the processing unit 1710 may determine that it is not possible to skip a transform.

Here, the specific size may be a boundary value for the block size for which it is permitted to skip a transform.

For example, when the condition in the following Code 7 is satisfied (i.e., when the result of the condition in Code 7 is true), the processing unit 1710 may determine that it is not possible to skip a transform, whereas when the condition in the following Code 7 is not satisfied (i.e. when the result of the condition in Code 7 is false), the processing unit 1710 may determine that it is possible to skip a transform.

[Code 7]
  if (log 2TrafoSize<=Log 2MaxTransformSkipSize)

At step 1930, the processing unit 1710 may determine whether the sharing of transform_skip_flag information with the target channel of the target block is to be used.

If it is determined that the transform_skip_flag information is not to be shared, step 1940 may be performed.

If it is determined that the transform_skip_flag information is to be shared, step 1950 may be performed.

For example, when the condition in the following Code 8 is satisfied (i.e. when the result of the condition in Code 8 is true), the processing unit 1710 may determine that the transform_skip_flag information is to be shared, whereas when the condition in the following Code 8 is not satisfied (i.e. when the result of the condition in Code 8 is false), the processing unit 1710 may determine that the transform_skip_flag information is not to be shared.

[Code 8]
```
if ((cIdx !=0) && (cross-channel prediction is used))
```

In other words, at step 1930, when the target channel is not a representative channel and cross-channel prediction is used for the target block, the processing unit 1710 may determine that the transform_skip_flag information is to be shared with the target channel. In contrast, when the target channel is the representative channel or when cross-channel prediction is not used for the target block, the processing unit 1710 may determine that the transform_skip_flag information is not to be shared.

At step 1940, the processing unit 1710 may acquire transform_skip_flag information of the target channel from the bitstream. The processing unit 1710 may parse and read the transform_skip_flag information of the target channel from the bitstream.

The transform_skip_flag information may be stored in transform_skip_flag[x0][y0][cIdx].

At step 1950, the processing unit 1710 may set transform_skip_flag information so that the transform_skip_flag information of the representative channel is used as the transform_skip_flag information of the target channel.

The processing unit 1710 may use the transform_skip_flag information of the representative channel as the transform_skip_flag information of the target channel instead of parsing and reading the transform_skip_flag information of the target channel from the bitstream. In other words, the processing unit 1710 may store the value of transform_skip_flag [x0][y0] [0] in transform_skip_flag[x0][y0][cIdx].

That is, without requiring a procedure for parsing and reading the transform_skip_flag information of the target channel from the bitstream, the value previously stored in transform_skip_flag [x0][y0][0] may be equally used in transform_skip_flag[x0][y0][cIdx].

For example, transform_skip_flag information signaled for the luma (Y) channel, which is the representative channel, may be used even for the chroma channel (Cb and/or Cr).

In accordance with an embodiment, for the Cb signal, transform_skip_flag information may be transmitted, and for the Cr signal, the transform_skip_flag information for the Cb signal may be shared without transmission of transform_skip_flag information. In this case, the above-described Code 6 may be modified to the following Code 9:

[Code 9]
```
if ( log2TrafoSize <= Log2MaxTransformSkipSize ) {
  if ( (cIdx != 1) && "cross-channel prediction is used")
    transform_skip_flag[ x0 ][ y0 ][ cIdx ] = transform_skip_flag[ x0 ][ y0 ][ 1 ]
  else
    PARSE transform_skip_flag[ x0 ][ y0 ][ cIdx ] from compressed bitstream
} else
  transform_skip_flag[ x0 ][ y0 ][ cIdx ] = 0
```

When it is not possible to skip a transform for the target block, step 1960 may be performed.

At step 1960, information indicating that a transform is not to be skipped for the target block may be set. Because skipping a transform for the target block is not permitted, the value of transform_skip_flag [x0][y0][cIdx] may be set to 0.

Figure 20:
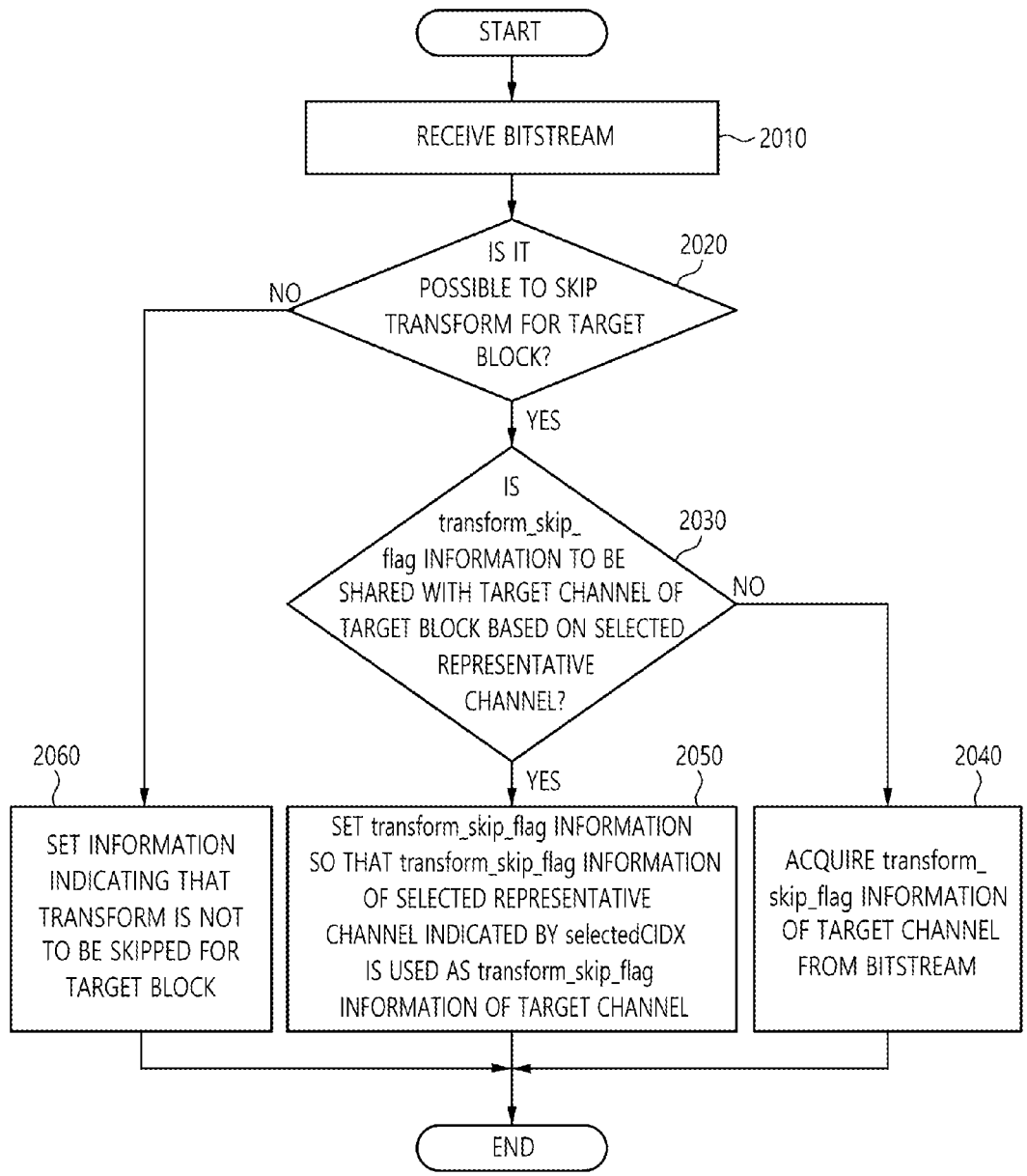
FIG. 20 is a flowchart of a decoding method for determining whether a transform is to be skipped with reference to an intra mode according to an embodiment.

FIG. 20 is a flowchart of a decoding method for determining whether a transform is to be skipped with reference to an intra mode according to an embodiment.

There may be a considerable correlation between the luma channel (i.e. Y) channel and the chroma channel (i.e. Cb and/or Cr) of an image. For example, the luma channel may include a large amount of information about the texture of the image, and the Cb channel and the Cr channel, which are chroma channels, may additionally provide color information to be added to the texture.

Therefore, when prediction required for compression and reconstruction of an image is performed, prediction values for the Cb block and the Cr block for which prediction is performed from the signal of the luma channel, previously acquired through decoding, may be calculated instead of independent predictions being respectively performed for three channels of a color space.

Technology for calculating these prediction values may be referred to as "Cross-Channel Prediction (CCP)" or the above-described "CCLM".

The decoding apparatus 1700 may determine whether cross-channel prediction has been used by checking whether the intra-prediction mode of the target block is one of an INTRA_CCLM mode, an INTRA_MMLM mode, and an INTRA_MFLM mode.

Since a considerable portion of the texture information of the chroma signal is also included in the luma signal, such cross-channel prediction may be effective. Similarly, prediction values for the Cr block, which is the target of prediction, may be calculated from the signal of the Cb channel using cross-channel prediction.

The case where cross-channel prediction is selected from among various technologies including angular prediction, DC prediction, and planar prediction for the prediction of the chroma signal or where cross-channel prediction is profitable may mean that the signal characteristics of the channel corresponding to SelectedCIDX are considerably similar to the signal characteristics of an additional channel.

Therefore, when it is profitable to skip (or perform) a transform for the block of the channel corresponding to SelectedCIDX, it may be equally profitable to also skip (or perform) a transform for the blocks of the remaining channels.

Therefore, when cross-channel prediction is used, the parsing of a bitstream may not be respectively performed for three channels in order to acquire transform_skip_flag information. When the transform_skip_flag information of the representative channel is parsed, the transform_skip_flag information of the remaining channels may not be separately parsed. The transform_skip_flag information of the representative channel may be shared and used as the transform_skip_flag information of the remaining channels, and information indicating such sharing may be recorded in a bitstream. For example, for such sharing, whether a transform is to be skipped may be determined using a channel corresponding to SelectedCIDX.

Alternatively, the rate-distortion values may be calculated for the case where a transform is equally skipped for three channels, and the rate-distortion values may be calculated for the case where a transform is equally performed for the three channels. The rate-distortion values calculated when the transform is skipped and the rate-distortion values calculated when the transform is performed may be compared with each other, and the encoding of channels may be performed using a more profitable scheme between a scheme for skipping a transform and a scheme for performing a transform based on the result of the comparison.

In an embodiment, instead of pieces of transform_skip_flag information being signaled for multiple channels, transform_skip_flag information may be signaled only for the channel corresponding to SelectedCIDX, and transform_skip_flag information may not be separately signaled for the remaining channels.

Below, an embodiment in which such transform_skip_flag information is shared will be described.

In an embodiment, the decoding apparatus 1700 may acquire transform_skip_flag information from the bitstream. Such acquisition may be represented by the following Code 10:

[Code 10]

```
if ( log2TrafoSize <= Log2MaxTransformSkipSize ) {
  if ( (cIdx != SelectedCIDX) && "cross-channel prediction is used")
    transform_skip_flag[ x0 ][ y0 ][ cIdx ] = transform_skip_flag[ x0 ][ y0 ][SelectedCIDX]
  else
    PARSE transform_skip_flag[ x0 ][ y0 ][ cIdx ] from compressed bitstream
} else
  transform_skip_flag[ x0 ][ y0 ][cIdx] = 0
``` x0 and y0 may be spatial coordinates indicating the location of the target block.

cIdx may indicate the target channel of the target block.

When the number of channels in an image is 3, the value of cIdx in Code 10 may be one of the values {0, 1, 2}. For example, the value of cIdx may be one of the predefined values {0, 1, 2}.

At step 2010, the communication unit 1720 may receive a bitstream.

At step 2020, the processing unit 1710 may determine whether it is possible to skip a transform for the target block.

When it is possible to skip a transform, step 2030 may be performed.

When it is not possible to skip a transform, step 2060 may be performed.

For example, the processing unit 1710 may determine that it is not possible to skip a transform when the size of the target block is less than or equal to a specific size.

For example, the processing unit 1710 may determine that it is not possible to skip a transform when the size of the target block is greater than a specific size.

Here, the specific size may be a boundary value for the block size for which it is permitted to skip a transform.

For example, when the condition in the following Code 11 is satisfied (i.e., when the result of the condition in Code 11 is true), the processing unit 1710 may determine that it is not possible to skip a transform, whereas w % ben the condition in the following Code 11 is not satisfied (i.e. when the result of the condition in Code 11 is false), the processing unit 1710 may determine that it is possible to skip a transform.

[Code 11]
 if (log 2TrafoSize<=Log 2MaxTransformSkipSize)

At step 2030, the processing unit 1710 may determine whether the sharing of transform_skip_flag information with the target channel of the target block is to be used based on the selected representative channel.

If it is determined that the transform_skip_flag information is not to be shared, step 2040 may be performed.

If it is determined that the transform_skip_flag information is to be shared, step 2050 may be performed.

For example, when the condition in the following Code 12 is satisfied (i.e., when the result of the condition in Code 12 is true), the processing unit 1710 may determine that the transform_skip_flag information is to be shared, whereas when the condition in the following Code 12 is not satisfied (i.e. when the result of the condition in Code 12 is false), the processing unit 1710 may determine that the transform_skip_flag information is not to be shared.

[Code 12]
 if ((cidx !=SelectedCIDX) && "cross-channel prediction is used")

In other words, at step 2030, when the target channel is not a selected representative channel indicated by SelectedCIDX and cross-channel prediction is used for the target block, the processing unit 1710 may determine to share the transform_skip_flag information with the target channel. Further, when the target channel is the selected representative channel indicated by SelectedCIDX or when cross-channel prediction is not used for the target block, the processing unit 1710 may determine not to share the transform_skip_flag information.

At step 2040, the processing unit 1710 may acquire the transform_skip_flag information of the target channel from the bitstream. The processing unit 1710 may parse and read the transform_skip_flag information of the target channel from the bitstream.

The transform_skip_flag information may be stored in transform_skip_flag [x0][y0][cIdx].

At step 2050, the processing unit 1710 may set the transform_skip_flag information so that the transform_skip_flag information of a selected representative channel indicated by SelectedCIDX is used as the transform_skip_flag information of the target channel.

The processing unit 1710 may use the transform_skip_flag information of the selected representative channel, indicated by SelectedCIDX, as the transform_skip_flag information of the target channel, instead of parsing and reading the transform_skip_flag information of the target channel from the bitstream. In other words, the processing unit 1710 may store the value of transform_skip_flag [x0][y0][SelectedCIDX] in transform_skip_flag [x0][y0][cIdx].

That is, the value previously stored in transform_skip_flag[x0][y0][SelectedCIDX] may also be equally used in transform_skip_flag[x0][y0][cIdx], without requiring a procedure for parsing and reading the transform_skip_flag information of the target channel from the bitstream.

At step 2060, information indicating that a transform is not to be skipped for the target channel of the target block may be set. Because skipping a transform for the target block is not permitted, the value of transform_skip_flag [x0][y0][cIdx] may be set to 0.

In other words, for the target channel of the target block indicated by cIdx, a predefined value of 0 may be set in the transform_skip_flag information in order to indicate that a transform is not to be skipped for the target channel, instead of parsing and reading transform_skip_flag information indicating whether a transform is to be skipped from the bitstream.

As described above in the above-described embodiment, the coding decision information of a selected representative channel may be shared with all channels except the selected representative channel.

The above-described embodiment may be partially modified. In other words, the coding decision information of the selected representative channel may be shared as the coding decision information of another specified channel. For example, the coding decision information may include transform_skip_flag information.

In other words, at step 2030, the processing unit 1710 may determine not to share transform_skip_flag information with the target channel 1) when the target channel is not a channel with which the coding decision information of the selected representative channel indicated by SelectedCIDX is shared, or 2) when cross-channel prediction is not used for the target block. Also, the processing unit 1710 may determine to share the transform_skip_flag information 1) when the target channel is a channel with which the coding decision information of the selected representative channel indicated by SelectedCIDX is shared, and 2) when cross-channel prediction is used for the target block.

The steps in Code 13 may be implemented as other steps at which the same meaning is maintained. For example, Code 13 may be modified to the following Code 15:

[Code 15]

```
if ( log2TrafoSize <= Log2MaxTransformSkipSize ) {
  if ((cIdx == 2) && ("cross-channel prediction is used"))
    transform_skip_flag[ x0 ][ y0 ][ cIdx ] = transform_skip_flag
[ x0 ][ y0 ][ SelectedCIDX ] // step 2050
  Else
    PARSE transform_skip_flag[ x0 ][ y0 ][ cIdx ] from compressed bitstream // step
2040
} else
  transform_skip_flag[ x0 ][ y0 ][ cIdx ] = 0 // step 2060
```

For example, when the value of SelectedCIDX is 1, a cIDX value of 1 indicates the Cb signal, and a cIDX value of 2 indicates the Cr signal, coding decision information for the Cb signal may be shared as the coding decision information of the Cr signal.

In other words, the coding decision information for the Cb signal may be transmitted from the encoding apparatus 1600 to the decoding apparatus 1700, and the coding decision information for the Cr signal may be set using the coding decision information for the Cb signal, rather than being separately transmitted.

When the coding decision information for the Cb signal is shared as the coding decision information for the Cr signal, the above-described Code 10 may be modified to the following Code 13:

Sharing of Transform Selection Information

Figure 21:
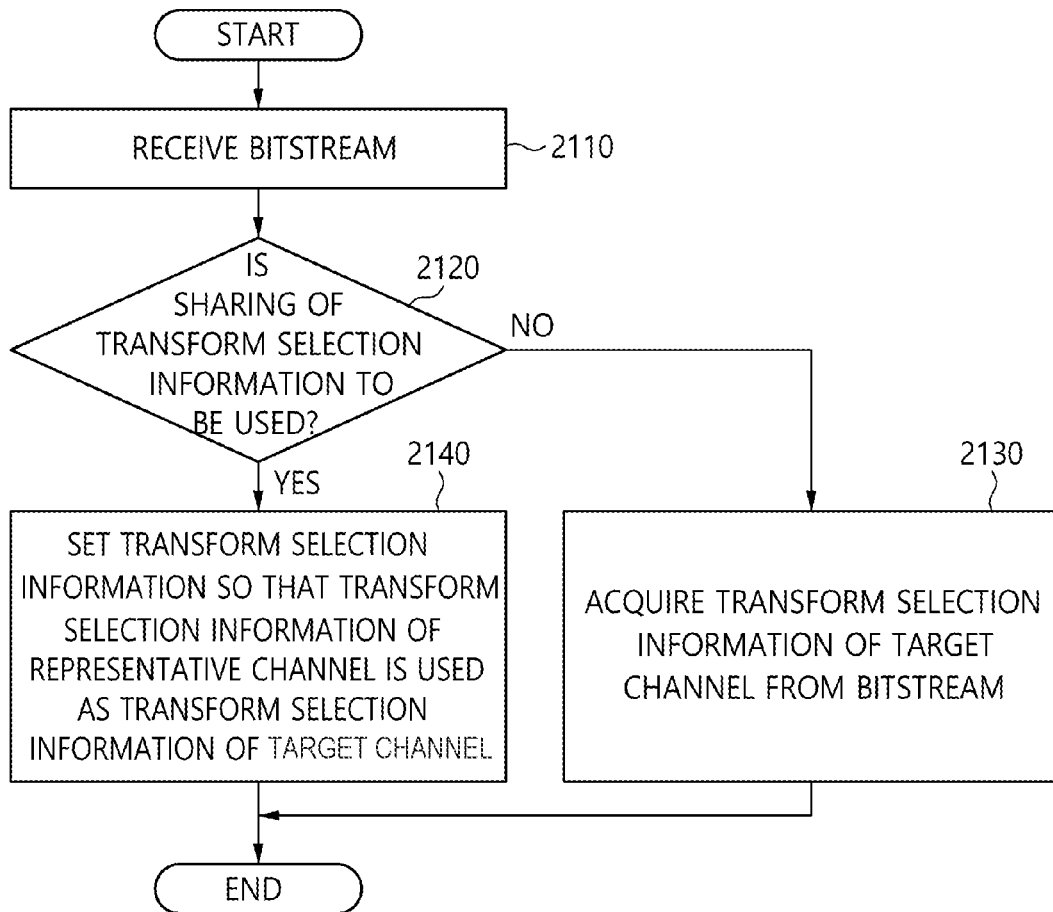
FIG. 21 is a flowchart of a method for sharing transform selection information according to an embodiment.

FIG. 21 is a flowchart of a method for sharing transform selection information according to an embodiment.

In the above-described embodiments, transform_skip_flag information has been described as coding decision information to be shared. The transform_skip_flag information in the above-described embodiments may be replaced with another type of coding decision information. Below, transform selection information will be described as coding decision information to be shared.

The transform selection information may be information indicating which transform is to be used for a transform block of a target channel. The transform selection informa-

[Code 13]

```
if ( log2TrafoSize <= Log2MaxTransformSkipSize ) {
  if (( cIdx != 2 ) or ( ! "cross-channel prediction is used" )) // ! means logical
negation
  PARSE
    transform_skip_flag[ x0 ][ y0 ][ cIdx ] from compressed bitstream // step 2040
  Else
    transform_skip_flag[ x0 ][ y0 ][cIdx] = transform_skip_flag
[ x0 ][ y0 ][ SelectedCIDX ] // step 2050
} else
  transform_skip_flag[ x0 ][ y0 ][cIdx] = 0 // step 2060
```

At step 2030, when the condition in the following Code 14 is satisfied (i.e. when the result of the condition in Code 14 is true), the processing unit 1710 may determine that the transform_skip_flag information is to be shared, whereas when the condition in the following Code 14 is not satisfied (i.e. when the result of the condition in Code 14 is false), the processing unit 1710 may determine that the transform_skip_flag information is not to be shared.
[Code 14]
if ((cIdx !=2) or (! "cross-channel prediction is used"))

tion may include the above-described primary transform selection information and/or secondary transform selection information.

There may be a considerable correlation between the luma channel (i.e. Y) channel and the chroma channel (i.e. Cb and/or Cr) of an image. For example, the luma channel may include a large amount of information about the texture of the image, and the Cb channel and the Cr channel, which are chroma channels, may additionally provide color information to be added to the texture.

Therefore, when prediction required for compression and reconstruction of an image is performed, prediction values for the Cb block and the Cr block for which prediction is performed from the signal of the luma channel, previously acquired through decoding, may be calculated instead of independent predictions being respectively performed for three channels of a color space. Since a considerable amount of texture information of a chroma signal may be included in a luma signal, such cross-channel prediction may be effective.

The case where cross-channel prediction is selected from among various technologies including angular prediction, DC prediction, planar prediction, etc. for predicting a chroma signal or where cross-channel prediction is more profitable may mean that the signal properties of a luma channel are considerably similar to those of a chroma channel (i.e. Cb and/or Cr).

Therefore, when it is profitable to use a specific transform among multiple transforms for the luma block, it may be profitable to use the same transform for the chroma block (i.e. the Cb block and/or the Cr block).

In other words, generally, the same transform may be used for the luma block and the chroma block. Alternatively, when a specific transform is used for the luma block, an additional specific transform corresponding to the specific transform used for the luma block may be used for the chroma block.

Therefore, when cross-channel prediction is used, if one transform is determined, the determined transform may be equally used for the luma channel and chroma channel(s), i.e., three channels, instead of transforms used for the luma channel and chroma channel(s) being respectively signaled.

Alternatively, if one transform is determined for the luma channel, a transform corresponding to the transform determined for the luma channel may be used for the chroma channels.

When the transform to be used for channels is determined in this way, the luma channel and the chroma channel(s) may be encoded based on the determination. For such encoding, one of multiple available transforms may be selected only for the luma channel, and the one transform for the luma channel is selected, and thus a transform for the chroma channel(s) may be automatically determined.

Alternatively, encoding using the same transform may be performed on three channels. By means of this encoding, the rate-distortion values may be calculated for multiple transforms. Thereafter, through a comparison between the rate-distortion values of applicable transforms, a transform having the most profitable rate-distortion value may be selected, and encoding may be performed depending on the selected transform.

Alternatively, encoding using a transform set may be performed on three channels. The transform set may include a specific transform used for the luma channel and transform(s) that are used for chroma channel(s) and correspond to the specific transform.

By means of this encoding, the rate-distortion values may be calculated for multiple transform sets. Thereafter, through a comparison between the rate-distortion values of applicable transform sets, the transform set having the most profitable rate-distortion value may be selected, and encoding may be performed depending on the selected transform set.

In an embodiment, instead of separately signaling pieces of transform selection information for multiple channels, transform selection information may be signaled only for a luma signal (luma channel), and transform selection information may not be separately signaled for the remaining channels that are chroma channels.

In an embodiment, the decoding apparatus 1700 may acquire transform selection information from a bitstream.

At step 2110, a communication unit 1720 may receive the bitstream.

At step 2120, a processing unit 1710 may determine whether the sharing of transform selection information with a target channel of a target block is to be used.

When the transform selection information is not to be shared, step 2130 may be performed.

When the transform selection information is to be shared, step 2140 may be performed.

At step 2130, the processing unit 1710 may acquire the transform selection information of the target channel from the bitstream. The processing unit 1710 may parse and read the transform selection information of the target channel from the bitstream.

At step 2140, the processing unit 1710 may set the transform selection information so that the transform selection information of a representative channel is used as the transform selection information of the target channel.

Steps 2120, 2130, and 2140 may be represented by the following Code 16:

| [Code 16] |
| --- |
| if ( (cIdx != 0) && "cross-channel prediction is used")<br>  transform selection information [ x0 ][ y0 ][ cIdx ] = transform selection information [ x0 ][ y0 ][0]<br>else<br>  PARSE transform selection information [ x0 ][ y0 ][ cIdx ] from compressed bitstream | x0 and y0 may be spatial coordinates indicating the location of the target block.

cIdx may indicate the target channel of the target block.

When the number of channels in an image is 3, the value of cIdx in Code 16 may be one of the values (0, 1, 2). For example, the value of cIdx may be one of the predefined values {0, 1, 2}.

cIdx of the representative channel may be assumed to be 0.

cIdx !=0" may indicate that the target channel is not a representative channel (e.g. a luma channel). A cIdx value of 0 may indicate that the target channel is the representative channel.

In other words, at step 2120, when the target channel is not a representative channel and cross-channel prediction is used for the target block, the processing unit 1710 may determine that the sharing of transform selection information with the target channel is to be used. When the target channel is a representative channel or when cross-channel prediction is not used for the target block, the processing unit

1710 may determine that the sharing of transform selection information with the target channel is not to be used.

At step 2130, the processing unit 1710 may acquire the transform selection information of the target channel from the bitstream. The processing unit 1710 may parse and read the transform selection information of the target channel from the bitstream.

The transform selection information may be stored in transform selection information[x0][y0][cIdx].

At step 2140, the processing unit 1710 may set the transform selection information so that the transform selection information of the representative channel is used as the transform selection information of the target channel.

The processing unit 1710 may use the transform selection information of the representative channel as the transform selection information of the target channel, instead of parsing and reading the transform selection information of the target channel from the bitstream. That is, the processing unit 1710 may store the value of transform selection information[x0][y0][0] in transform selection information [x0][y0][cIdx].

That is, without requiring a procedure for parsing and reading the transform selection information of the target channel from the bitstream, the value previously stored in transform selection information[x0][y0][0] may be equally used in transform selection information[x0][y0][cIdx].

Determination of whether cross-channel prediction is to be used

In the embodiments described above with reference to FIGS. 18 to 21, it has been exemplified that whether cross-channel prediction is to be used is determined by checking whether the intra-prediction mode of a target block is one of an INTRA_CCLM mode, an INTRA_MMLM mode, and an INTRA_MFLM mode. In other words, when the intra-prediction mode of the target block is one of the INTRA_CCLM mode, the INTRA_MMLM mode, and the INTRA_MFLM mode, cross-channel prediction may be used. When the intra-prediction mode of the target block is none of the INTRA_CCLM mode, the INTRA_MMLM mode, and the INTRA_MFLM mode, cross-channel prediction may not be used.

The above-described determination of whether cross-channel prediction is to be used is only an example, and whether cross-channel prediction is to be used may be determined through one of the following Codes 17 to 23. For example, when the value of the condition in each of the following Codes is true, cross-channel prediction may be used, whereas when the value of the condition in each of the following Codes is false, cross-channel prediction may not be used. "intra_chroma_pred_mode" may be the intra-prediction mode of a chroma channel.

[Code 17]
  if (intra_chroma_pred_mode=CCLM mode)
[Code 18]
  if (intra_chroma_pred_mode=DM mode)
[Code 19]
  if (intra_chroma_pred_mode=INTRA_CCLM mode)
[Code 20]
  if (intra_chroma_pred_mode=INTRA_MMLM mode)
[Code 21]
  if (intra_chroma_pred_mode=INTRA_MFLM mode)
[Code 22]
  if ((intra_chroma_pred_mode=INTRA_CCLM mode)||
  (intra_chroma_pred_mode=INTRA_MMLM mode)||
  (intra_chroma_pred_mode=INTRA_MFLM mode))
[Code 23]
  if ((intra_chroma_pred_mode=DM mode)||
  (intra_chroma_pred_mode=INTRA_CCLM mode)||
  (intra_chroma_pred_mode=INTRA_MMLM mode)||
  (intra_chroma_pred_mode=INTRA_MFLM mode))

Each of the CCLM mode, the DM mode, the INTRA_CCLM mode, the INTRA_MMLM mode, and the INTRA_MFLM mode described in Codes 17 to 23 may indicate one value of intra_chroma_pred_mode presented in a first column in the above-described Tables 10 and 11. In relation to the CCLM mode, the DM mode, the INTRA_CCLM mode, the INTRA_MMLM mode, and the INTRA_MFLM mode, the foregoing description made above in relation to Tables 10 and 11 may be referred to.

When it is intended to determine whether cross-channel prediction is to be used, the size of a block may be additionally considered in schemes in the above-described Codes 17 to 23.

The determination of whether cross-channel prediction is to be used may also be performed through one of the following Codes 24 to 30. For example, when the value of the condition in each of the following Codes is true, cross-channel prediction may be used, whereas when the value of the condition in each of the following Codes is false, cross-channel prediction may not be used.

[Code 24]
  if ((intra_chroma_pred_mode=CCLM mode) && block size condition)
[Code 25]
  if ((intra_chroma_pred_mode=DM mode) && block size condition)
[Code 26]
  if ((intra_chroma_pred_mode=INTRA_CCLM mode) && block size condition)
[Code 27]
  if ((intra_chroma_pred_mode=INTRA_MMLM mode) && block size condition)
[Code 28]
  if ((intra_chroma_pred_mode=INTRA_MFLM mode) && block size condition)
[Code 29]
  if ((intra_chroma_pred_mode=INTRA_CCLM mode)||
  (intra_chroma_pred_mode=INTRA_MMLM mode)||
  (intra_chroma_pred_mode=INTRA_MFLM mode) && block size condition)
[Code 30]
  if ((intra_chroma_pred_mode=DM (direct mode) mode)||
  (intra_chroma_pred_mode=INTRA_CCLM mode)||
  (intra_chroma_pred_mode=INTRA_MMLM mode)||
  (intra_chroma_pred_mode=INTRA_MFLM mode) && block size condition)

The block size conditions presented in Code 24 to Code 30 may be replaced with one of the following codes Code 31, Code 32, Code 33, and Code 34.

[Code 31]
  ((log 2TbWidth<=Log 2MaxSizeWidth) && (log 2TbHeight<=Log 2MaxSizeHeight))
[Code 32]
  ((log 2TbWidth>=Log 2MinSizeWidth) && (log 2TbHeight>=Log 2MinSizeHeight))
[Code 33]
  ((log 2TbWidth>Log 2MinSizeWidth) && (log 2TbHeight<=Log 2MaxSizeHeight))
[Code 34]
  ((log 2TbWidth>Log 2MinSizeWidth) && (log 2TbHeight>Log 2MaxSizeHeight))

log 2TbWidth and log 2TbHeight have been described above with reference to Equations 11 and 12.

Log 2MaxSizeWidth, Log 2MaxSizeHeight, Log 2MinSizeWidth and Log 2MinSizeHeight may be predefined values. Log 2MaxSizeWidth may be the width of a block having the maximum size. Log 2MaxSizeHeight may be the height of the block having the maximum size. Log 2MinSizeWidth may be the width of a block having the minimum size. Log 2MinSizeHeight may be the height of the block having the minimum size.

For example, the value of Log 2MaxSizeWidth may be 16, the value of Log 2MaxSizeHeight may be 16, the value of Log 2MinSizeWidth may be 4, and the value of Log 2MinSizeHeight may be 4.

Alternatively, the value of Log 2MaxSizeWidth may be 32, and the value of Log 2MaxSizeHeight may be 32.

When a DM is used, the intra-prediction mode of a chroma signal may not be separately signaled. When a DM is used, an intra-prediction mode signaled for a luma signal may also be used in a chroma mode without change.

Encoding and Decoding Using Sharing of Selective Information Between Channels Under Block Partition Structure Generally, when an image is encoded, suitable encoding schemes may be separately used for multiple spatial areas in consideration of spatial characteristics in the image. For this encoding, an image may be partitioned into CUs, and the CUs generated from partitioning may be respectively encoded.

In order to perform this encoding, the same block partition structure may be used for a luma channel and for a chroma channel.

However, the characteristics of a luma signal and the characteristics of a chroma signal may be different from each other. In consideration of the difference between the characteristics, different block partition structures may be respectively used for the luma channel and the chroma channel in order to achieve more effective encoding.

Hereinafter, the case where the block partition structure of the image is identical for the luma signal and the chroma signal (or multiple channels) is referred to as a "single-tree block partition structure" or "single tree".

Hereinafter, the case where the block partition structure of the image is not identical for the luma signal and the chroma signal (or multiple channels) is referred to as a "dual-tree block partition structure" or "dual tree".

In an embodiment, a block of an additional channel to which a target block of a target channel corresponds may be specified between a luma channel and a chroma channel (or multiple channels). The block of the additional channel corresponding to the target block of the target channel is referred to as a "corresponding block (col-block)".

In an embodiment, when the luma channel and the chroma channel (or multiple channels) have the same block partition structure (i.e. when a single tree is applied), the block of an additional channel to which the target block of the target channel corresponds may be specified.

In an embodiment, when the luma channel and the chroma channel (or multiple channels) have different block partition structures (i.e. when a dual tree is applied), the block of an additional channel to which the target block of the target channel corresponds may be specified.

When the luma channel and the chroma channel (or multiple channels) have different block partition structures (i.e. when a dual tree is applied), coding decision information of the corresponding block may be shared with the target block of the target channel. Through the sharing of the coding decision information, the target block is encoded, and thus encoding efficiency may be improved.

The coding decision information of the corresponding block, which corresponds to the target block of the target channel, may be parsed from a compressed bitstream.

The coding decision information of the corresponding block, which corresponds to the target block of the target channel, may be parsed from the compressed bitstream, and the target block of the target channel may be decoded using the coding decision information of the corresponding block.

For example, transform_skip_flag information of the corresponding block, which corresponds to the target block of the target channel, may be parsed, and the transform_skip_flag information of the corresponding block may be used to determine whether a transform is to be skipped for the target block.

Shared information may be coding decision information that is shared between the luma block and the chroma block.

When the block partition structure of a first channel and the block partition structure of a second channel are identical to each other, if the spatial location of the first block of the first channel corresponds to the spatial location of the second block of the second channel, the first block and the second block may correspond to each other (i.e. may be co-located). In other words, the corresponding blocks of different channels may be blocks in different channels having corresponding (co-located) spatial locations. Shared information of the second block, corresponding to the first block, may be used for encoding and/or decoding of the first block.

When the block partition structure of the chroma channel is identical to the block partition structure of the luma channel, a luma block corresponding to a specific chroma block of the chroma channel may be a luma block at a spatial location corresponding to the spatial location of the specific chroma block. In this case, shared information of the luma block corresponding to the chroma block may be used for encoding and/or decoding of the chroma block.

Figure 22:
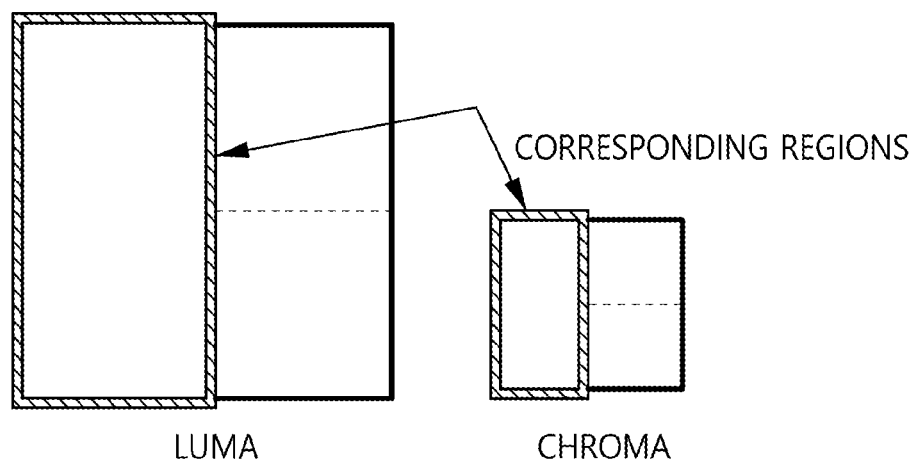
FIG. 22 illustrates a single-tree block partition structure according to an example.

FIG. 22 illustrates a single-tree block partition structure.

Figure 23:
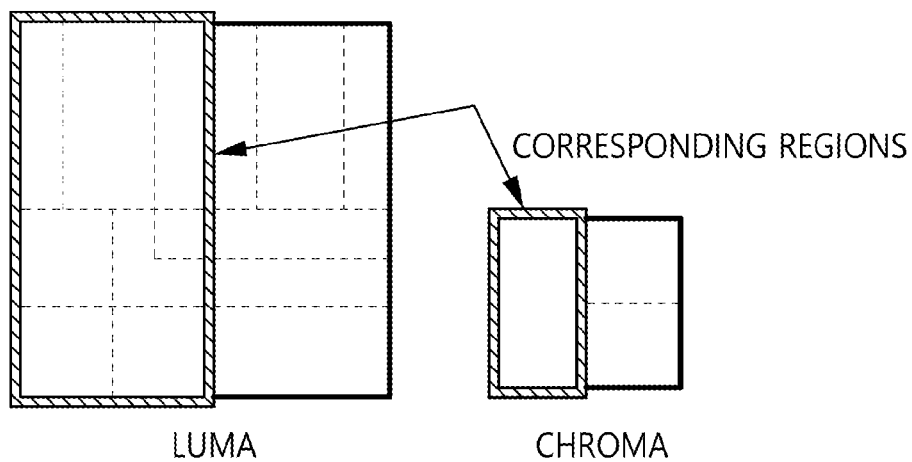
FIG. 23 illustrates a dual-tree block partition structure according to an example.

FIG. 23 illustrates a dual-tree block partition structure.

Under a 4:2:0 color subsampling structure, a luma signal region spatially corresponding to a chroma block may occupy an area four times as large as the chroma block. In other words, the horizontal length (width) and the vertical length (height) of the luma signal region may be twice the horizontal length and the vertical length of the chroma block.

As illustrated in FIG. 22, in the corresponding image regions of a chroma channel and a luma channel, the block partition structure of the chroma channel and the block partition structure of the luma channel may be identical to each other. In other words, a single tree may be used for the chroma channel and the luma channel.

In FIG. 22 and subsequent drawings, image regions corresponding to each other are indicated by "corresponding regions".

As illustrated in FIG. 23, in the corresponding image regions of the chroma channel and the luma channel, the block partition structure of the chroma channel and the block partition structure of the luma channel may be different from each other. In other words, a dual tree may be used for the chroma channel and the luma channel.

For example, in FIG. 23, the region of a luma channel spatially corresponding to one chroma block may be partitioned into eight blocks.

When block partition structures in the corresponding image regions of the luma channel and the chroma channel are identical to each other, a block of the luma channel spatially corresponding to a specific chroma block may be unambiguously specified.

In contrast, when the block partition structure of the luma channel is not identical to the block partition structure of the chroma channel, for a specified chroma block determined through partitioning depending on the block partition structure of the chroma channel, a luma block corresponding to the specified chroma block may not be definitely specified in the luma channel. As illustrated in FIG. 23, this ambiguity is due to the fact that the block partition structure of the chroma channel and the block partition structure of the luma channel are not identical to each other.

In an embodiment, a method for specifying the luma block corresponding to the chroma block will be described for the case in which the block partition structure of the luma channel is not identical to the block partition structure of the chroma channel.

For example, multiple luma blocks corresponding to the chroma block may be specified. By means of this specification, piece(s) of shared information may be acquired from one or more luma blocks corresponding to the chroma block, which is a target block, and encoding and/or decoding of the chroma block may be performed using the acquired piece(s) of shared information.

Below, a method for specifying one or more blocks of a second channel corresponding to the block of a first channel will be described for the case where the block partition structure of the first channel is not identical to that of the second channel. In the following description, although the first channel will be described as being the chroma channel and the second channel will be described as being the luma channel, the chroma channel and the luma channel are merely exemplary, and the first channel and the second channel may be different types of channels, as described above.

Figure 24:
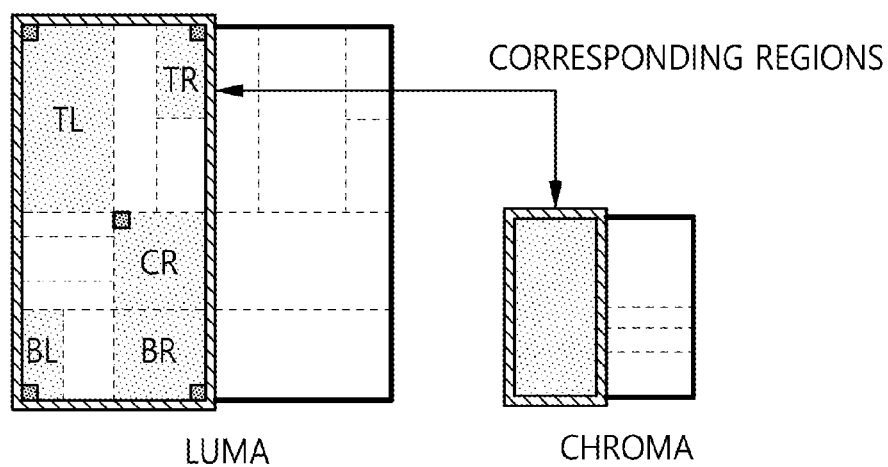
FIG. 24 illustrates a scheme for specifying a corresponding block based on a location in a corresponding region according to an example.

FIG. 24 illustrates a scheme for specifying a corresponding block based on the location in a corresponding region according to an example.

A corresponding region indicating luma blocks corresponding to a chroma block may be specified as a rectangular region. The location of an uppermost-leftmost pixel in the rectangular region may be (xCb, yCb). The location of a lowermost-rightmost pixel in the rectangular region may be (xCb+cbWidth−1, yCb+cbHeight−1).

The location (xCb, yCb) may indicate the location of a luma pixel corresponding to the location of an uppermost-leftmost pixel in the chroma block (i.e. chroma coding block).

cbWidth and cbHeight may be values respectively indicating the width and the height of a target block based on the luma pixel.

In other words, the corresponding region indicating luma blocks corresponding to the chroma block may be defined as a rectangular region in which the location of the uppermost-leftmost pixel based on the location of the luma pixel is (xCb, yCb), and which has a horizontal width of cbWidth and a vertical height of cbHeight.

The corresponding region indicating luma blocks corresponding to the above-described chroma block may be applied to embodiments described above with reference to FIGS. 24 to 31.

In FIG. 24, the luma blocks corresponding to the chroma block may be luma blocks present at predefined locations in the corresponding region of the luma channel spatially corresponding to the chroma block.

In other words, luma blocks present at predefined locations in the corresponding region of the luma channel spatially corresponding to the chroma block may be specified as one or more luma blocks corresponding to the chroma block. Alternatively, luma blocks occupying predefined locations in the corresponding region of the luma channel spatially corresponding to the chroma block may be specified as one or more luma blocks corresponding to the chroma block.

For example, the predefined locations may be a center (CR) location, a top-left (TL) location, a top-right (TR) location, a bottom-left (BL) location, and a bottom right (BR) location in the region of the luma channel spatially corresponding to the chroma block.

The CR location may indicate (xCb+cbWidth/2, yCb+cbHeight/2). The TL location may indicate (xCb, yCb). The TR location may indicate (xCb+cbWidth−1, yCb). The BL location may indicate (xCb, yCb+cbHeight−1). The BR location may indicate (xCb+cbWidth−1, yCb+cbHeight−1).

In an embodiment, a block of an additional channel to which the target block of the target channel corresponds may be specified among multiple channels, such as a luma channel and a chroma channel. The block of the additional channel corresponding to the target block of the target channel is referred to as a "corresponding block".

In an embodiment, in the region of the luma channel spatially corresponding to the chroma block, a luma block including a luma pixel present at the location (xCb+cbWidth/2, yCb+cbHeight/2) indicative of the center (CR) may be the corresponding block. Therefore, when the target block is partitioned in the form of a dual tree, a certain block of an additional channel (e.g. a luma channel) to which the target block of the target channel (e.g. a chroma channel) corresponds, among multiple channels, may be unambiguously specified. In an embodiment, in the encoding and/or decoding of the chroma channel, a luma block including a luma pixel present at the location (xCb+cbWidth/2, yCb+cbHeight/2) may be specified as the corresponding block. Information about the specified corresponding block may be used to encode and/or decode the target block.

For example, the predefined locations may be some of the CR location, TL location, TR location, BL location, and BR location in the region of the luma channel spatially corresponding to the chroma block.

For example, the luma blocks corresponding to the chroma block may be blocks including at least one of pixels located at the center location, the top-left location, the top-right location, the bottom-left location, and the bottom-right location in the region of the luma channel spatially corresponding to the chroma block.

For example, the luma blocks corresponding to the chroma block may be some of blocks including at least one of pixels located at the center location, the top-left location, the top-right location, the bottom-left location, and the bottom-right location in the region of the luma channel spatially corresponding to the chroma block.

For example, the luma blocks corresponding to the chroma block may include blocks including at least one of pixels located at the center location, the top-left location, the top-right location, the bottom-left location, and the bottom-right location in the region of the luma channel spatially corresponding to the chroma block.

Figure 25:
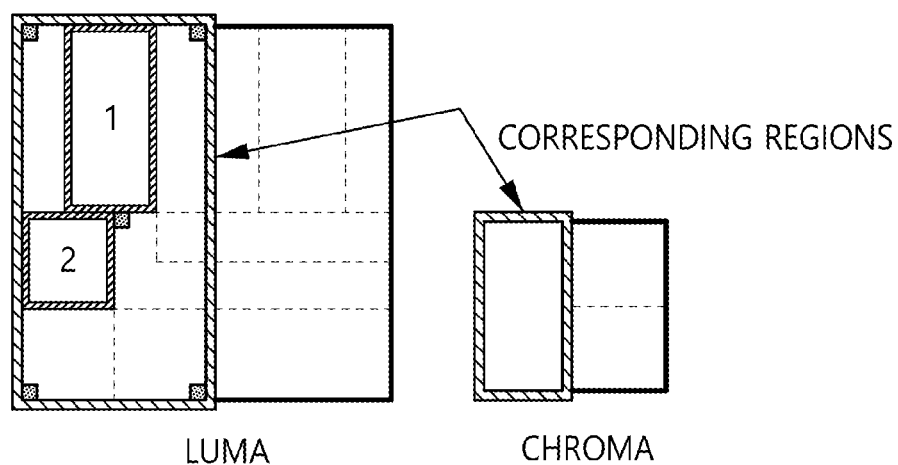
FIG. 25 illustrates a scheme for specifying a corresponding block based on an area in a corresponding region according to an example.

FIG. 25 illustrates a scheme for specifying a corresponding block based on the area in a corresponding region according to an example.

Figure 26:
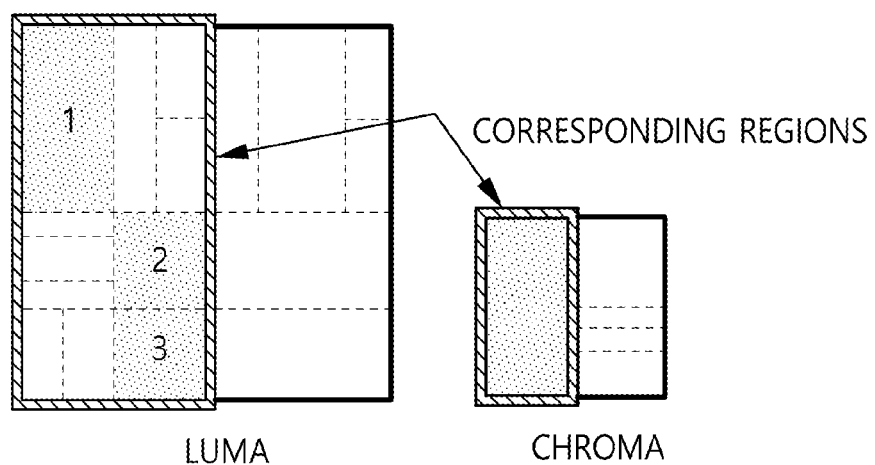
FIG. 26 illustrates another scheme for specifying a corresponding block based on an area in a corresponding region according to an example.

FIG. 26 illustrates another scheme for specifying a corresponding block based on the area in a corresponding region according to an example.

Luma blocks corresponding to a chroma block may indicate the luma block having the largest area in the region of a luma channel spatially corresponding to the chroma block.

Alternatively, the luma blocks corresponding to the chroma block may be a predefined number of luma blocks having the largest area in the region of the luma channel spatially corresponding to the chroma block.

Such a specifying scheme may be due to the fact that there is a strong possibility that the features of the luma block having the largest area in the region of the luma channel corresponding to the chroma block or a predefined number of luma blocks having the largest area will be similar to those of the chroma block.

As illustrated in FIG. 25, the predefined number may be 2. In FIG. 25 two blocks (i.e. block 1 and block 2) having the largest area may be selected from among eight luma blocks in the region of the luma channel corresponding to the chroma block.

As illustrated in FIG. 26, the predefined number may be 3. In FIG. 26, three blocks (i.e. block 1, block 2, and block 3) having the largest area may be selected from among eight luma blocks in the region of the luma channel corresponding to the chroma block.

Through this specifying scheme, even if the block partition structures of the luma channel and the chroma channel are not identical to each other, encoding efficiency may be improved by utilizing shared information.

Figure 27:
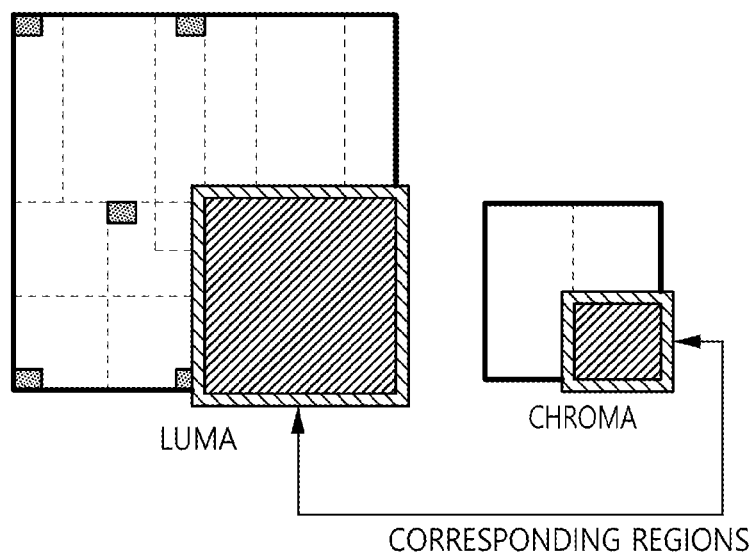
FIG. 27 illustrates a scheme for specifying a corresponding block based on the form of a block in a corresponding region according to an example.

FIG. 27 illustrates a scheme for specifying a corresponding block based on the form of a block in a corresponding region according to an example.

Figure 28:
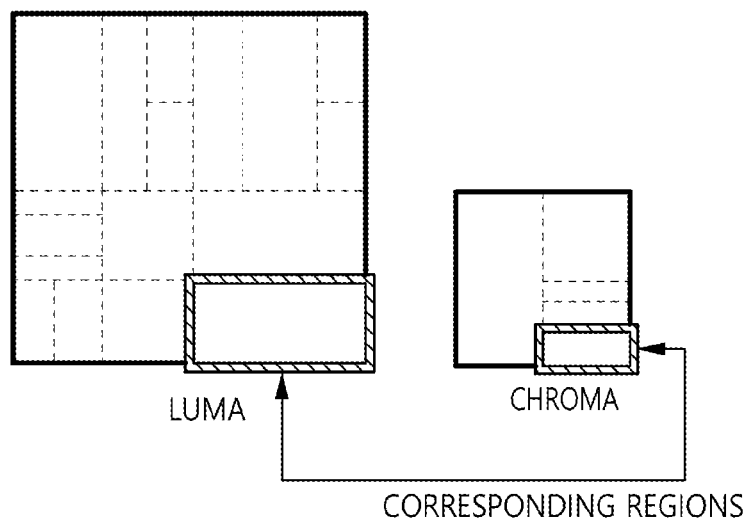
FIG. 28 illustrates another scheme for specifying a corresponding block based on the form of a block in a corresponding region according to an example.

FIG. 28 illustrates another scheme for specifying a corresponding block based on the form of a block in a corresponding region according to an example.

Luma blocks corresponding to a chroma block may indicate a luma block, having the same form as the chroma block, in the region of a luma channel spatially corresponding to the chroma block.

For example, the form of the block may include the size of the block.

Depending on the dual-tree block partition structure, such as those illustrated in FIGS. 27 and 28, the block partition structure of a CU of the chroma channel may not be identical to the block partition structure of a CU in the region of the luma channel corresponding to the CU of the chroma channel. Even in this case, the region of the luma channel corresponding to the region of a target block in the CU of the chroma channel may be present as a single block.

In this case, a single luma block in the region of the luma channel corresponding to the chroma block may accurately match the chroma channel. Shared information of the matched luma block may be shared as coding decision information of the chroma block.

Figure 29:
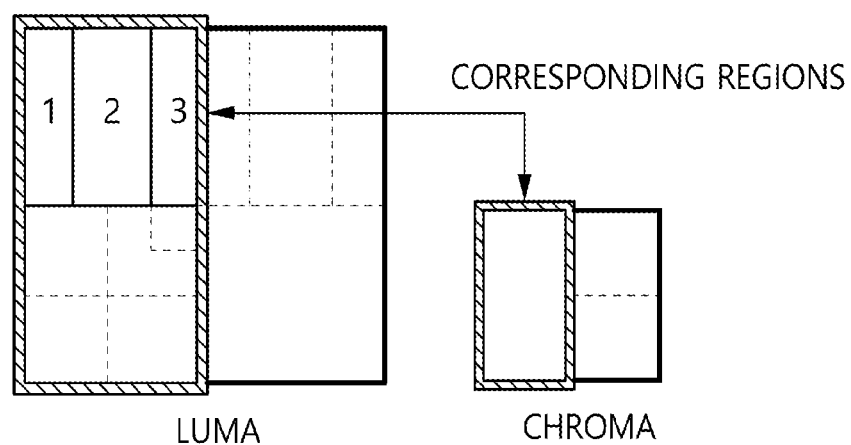
FIG. 29 illustrates a scheme for specifying a corresponding block based on the aspect ratio of a block in a corresponding region according to an example.

FIG. 29 illustrates a scheme for specifying a corresponding block based on the aspect ratio of a block in a corresponding region according to an example.

Figure 30:
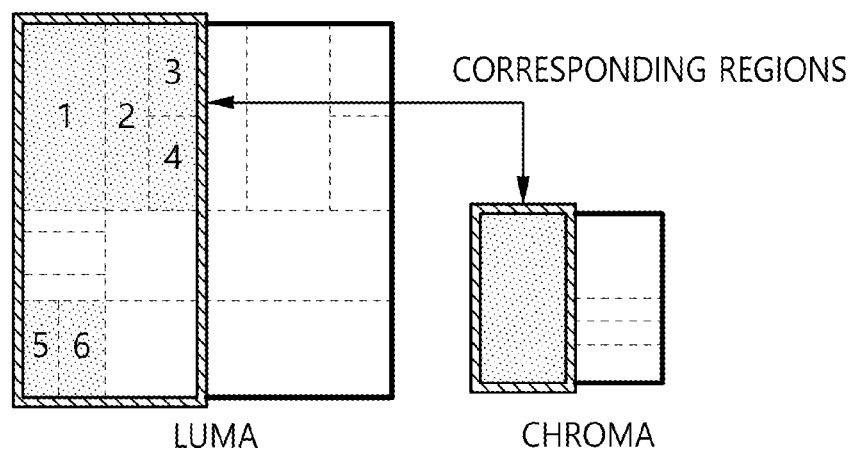
FIG. 30 illustrates another scheme for specifying a corresponding block based on the aspect ratio of a block in a corresponding region according to an example.

FIG. 30 illustrates another scheme for specifying a corresponding block based on the aspect ratio of a block in a corresponding region according to an example.

Luma blocks corresponding to a chroma block may be luma block(s), having the same aspect ratio as the chroma block, in the region of a luma channel spatially corresponding to the chroma block.

Alternatively, luma blocks corresponding to a chroma block may be luma block(s), having aspect ratios similar to that of the chroma block, in the region of the luma channel spatially corresponding to the chroma block.

For example, in the region of the luma channel of FIG. 29, luma block 2 may be selected, and in the region of the luma channel of FIG. 30, luma block 1 may be selected.

Here, the aspect ratio of the block may be the ratio of the horizontal length to the vertical length of the corresponding block. In other words, the aspect ratio of the block may be a value obtained by dividing the horizontal length of the block by the vertical length of the block.

For example, whether the aspect ratios of blocks are equal to each other may be determined using the following Equation 13:

$$(\log_2 \text{Width}_{Chroma} - \log_2 \text{Height}_{Chroma}) == (\log_2 \text{Width}_{Luma} - \log_2 \text{Height}_{Luma})$$ [Equation 13]

$\text{Width}_{Chroma}$ may be the width of the chroma block. $\text{Height}_{Chroma}$ may be the height of the chroma block.

$\text{Width}_{Luma}$ may be the width of the luma block corresponding to the chroma block. $\text{Height}_{Luma}$ may be the height of the luma block corresponding to the chroma block.

Whether the aspect ratios are similar to each other may be determined using the following Equation 14:

$$|(\log_2 \text{WidthChroma} - \log_2 \text{HeightChroma}) == (\log_2 \text{WidthLuma} - \log_2 \text{HeightLuma})| < THD$$ [Equation 14]

"|x|" may indicate the absolute value of x.

THD may be a threshold value. For example, the value of THD may be 2.

According to Equations 13 and 14, one or more luma blocks having the same aspect ratio as the chroma block may be specified as corresponding blocks. Alternatively, one or more luma blocks having aspect ratios similar to that of the chroma block may be specified as corresponding blocks.

Figure 31:
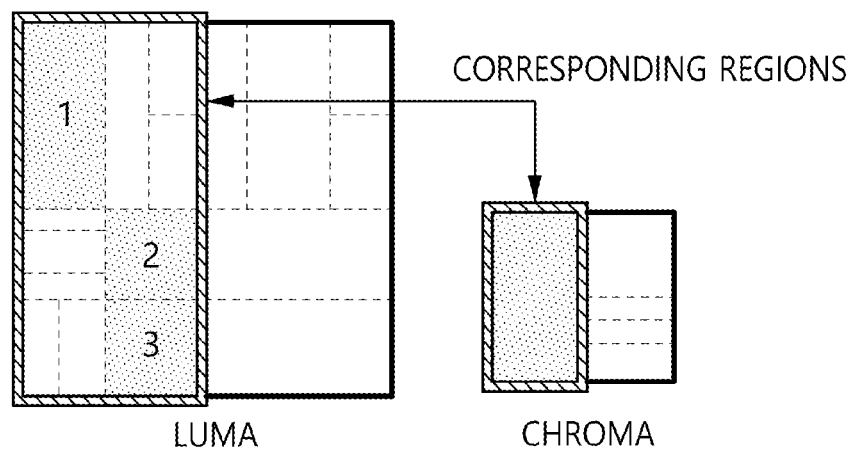
FIG. 31 illustrates a scheme for specifying a corresponding block based on the encoding features of a block in a corresponding region according to an example.

FIG. 31 illustrates a scheme for specifying a corresponding block based on the encoding properties of a block in a corresponding region according to an example.

Although the block partition structure of a chroma channel and the block partition structure of a luma channel are independent of each other, if a luma block having the same coding decision information as the chroma block is present among luma blocks in the region of the luma channel spatially corresponding to the chroma block, the shared information of the chroma block and the shared information of the luma block may be identical to each other.

In order to utilize these characteristics, a luma block, having the same value as the chroma block for predefined coding decision information, may be specified as the luma block corresponding to the chroma block. Alternatively, a luma block, having a value similar to that of the chroma block for predefined coding decision information, may be specified as the luma block corresponding to the chroma block.

For example, the predefined coding decision information may be information about whether intra-prediction is used, an intra-prediction mode, motion prediction information, a motion vector, information about whether a merge mode is used, a derived mode, transform selection information, etc.

For example, the intra-prediction mode may be used as predefined coding decision information. In FIG. 31, luma block 1, luma block 2, and luma block 3 are illustrated in the region of the luma channel. The luma block 1, the luma block 2, and the luma block 3 may be luma blocks having an intra-prediction mode identical to (or similar to) the intra-prediction mode of the chroma block. The luma block 1, the luma block 2, and the luma block 3 may be specified as luma blocks corresponding to the chroma block.

In accordance with the above-described specific schemes, the luma block corresponding to the chroma block may include multiple luma blocks. When pieces of shared information of the multiple luma blocks are identical to each other, no problem may occur when the pieces of shared information are used for the chroma block. In contrast, when pieces of shared information of multiple luma blocks are not identical to each other, shared information to be used for encoding and/or decoding of the chroma block may be ambiguous.

A value corresponding to the majority of the values of pieces of shared information of multiple corresponding blocks may be used as the value of shared information of the chroma block. This decision method may be referred to as a "majority-based shared information decision method". Through this method, information to be shared may be efficiently shared without additional signaling.

For example, when transform_skip_flag information is shared, a value occupying the majority of the values of pieces of transform_skip_flag information of multiple luma blocks corresponding to the chroma block may be shared as the value of the transform_skip_flag information of the chroma block. By means of this sharing, encoding and/or decoding of the chroma block may be performed.

For example, shared information may be used only when the number of luma blocks corresponding to the chroma block is only one. The shared information may be used only when there is only one luma block that satisfies the above-described specific condition in the region of the luma channel spatially corresponding to the chroma block. Alternatively, when the region of an additional channel spatially corresponding to the target block of a target channel is specified only by a single block, coding decision information may be shared between channels.

Referring to FIG. 27, when the region of the luma channel spatially corresponding to the target block of the chroma channel is partitioned into only one block, the one block may be the corresponding block of the luma channel. This shared information of the corresponding block may be used to encode and/or decode the chroma block.

When the region of the luma channel spatially corresponding to the target block of the chroma channel is not partitioned into one block, coding decision information may not be shared without separate signaling.

Figure 32:
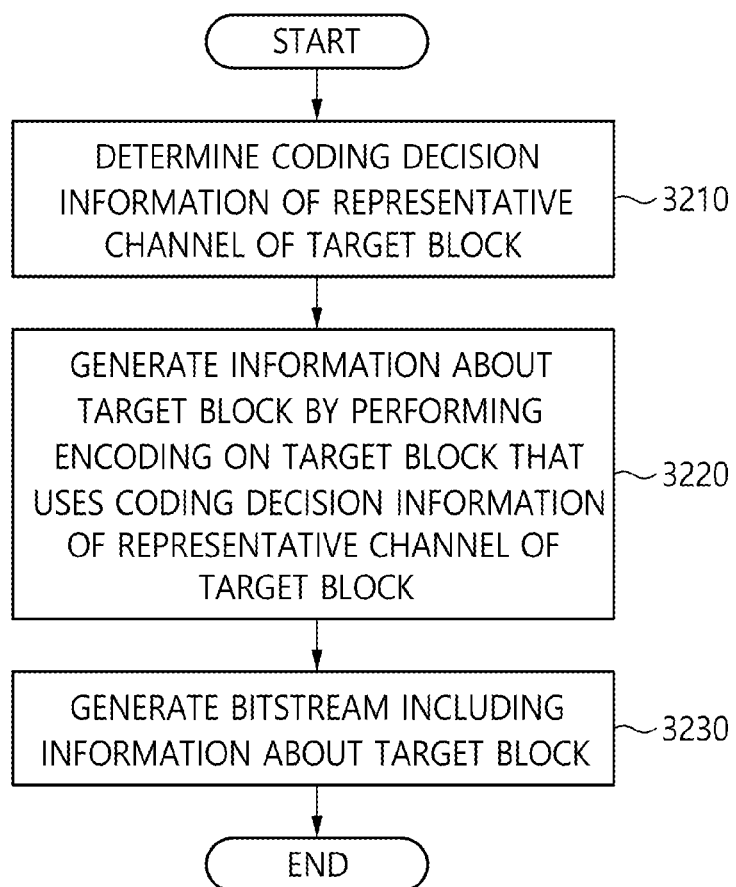
FIG. 32 is a flowchart of an encoding method according to an embodiment.

FIG. 32 is a flowchart of an encoding method according to an embodiment.

The encoding method and a bitstream generation method according to the present embodiment may be performed by an encoding apparatus 1600. The embodiment may be a part of a target encoding method or a video encoding method.

At step 3210, a processing unit 1610 may determine coding decision information of the representative channel of a target block.

At step 3220, the processing unit 1610 may generate information about the target block by performing encoding on the target block that uses the coding decision information of the representative channel of the target block.

At step 3230, the processing unit 1610 may generate a bitstream including the information about the target block.

The information about the target block may include coding decision information of the representative channel. Also, the bitstream and the information about the target block may not include coding decision information of a target channel.

The embodiment described with reference to FIG. 32 may be combined with the above-described additional embodiments. Repetitive descriptions will be omitted here.

Figure 33:
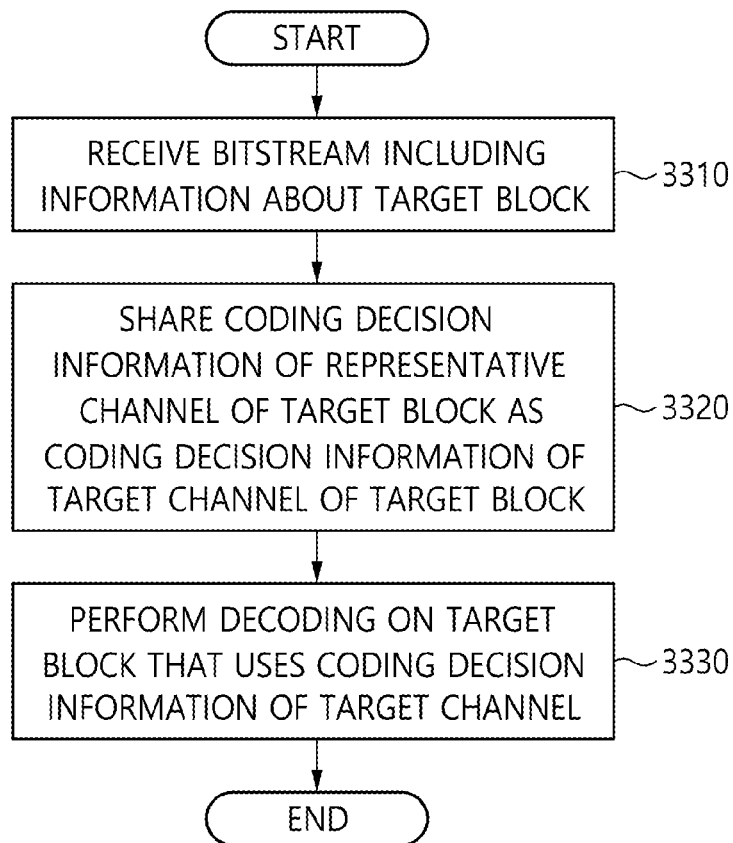
FIG. 33 is a flowchart of a decoding method according to an embodiment.

FIG. 33 is a flowchart of a decoding method according to an embodiment.

The decoding method according to the present embodiment may be performed by a decoding apparatus 1700.

At step 3310, a communication unit 1720 may receive a bitstream including information about a target block.

The information about the target block may include coding decision information of a representative channel. Also, the bitstream and the information about the target block may not include coding decision information of a target channel.

At step 3320, a processing unit 1710 may share the coding decision information of the representative channel of the target block as the coding decision information of the target channel of the target block.

The coding decision information of the representative channel may be shared as the coding decision information of the target channel.

At step 3330, the processing unit 1710 may perform decoding on the target block that uses the coding decision information of the target channel.

The embodiment described with reference to FIG. 33 may be combined with the above-described additional embodiments. Repetitive descriptions will be omitted here.

The above-described embodiments may be performed using the same method in the encoding apparatus 1600 and the decoding apparatus 1700.

The sequences in which the steps, operations, and procedures are to be applied in the embodiments may be different from each other in the encoding apparatus 1600 and the decoding apparatus 1700. Alternatively, the sequences in which the steps, operations, and procedures are to be applied in the embodiments may be equal to each other in the encoding apparatus 1600 and the decoding apparatus 1700.

The embodiments may be respectively performed on a luma signal and a chroma signal. Alternatively, the embodiments may be equally performed on the luma signal and the chroma signal.

The form of each block to which the embodiments are to be applied may be a square form or a non-square form.

Whether to apply the embodiments may be decided on based on the size of at least one of a CU, a PU, a TU, and a target block. Here, the size may be defined as the minimum size and/or the maximum size that enable the embodiments to be applied to the target, and may be defined as a fixed size that enables the embodiments to be applied to the target.

Further, a first embodiment may be applied to a first size, and a second embodiment may be applied to a second size. That is, the embodiments may be complexly applied according to the size of the target. Also, the embodiments may be applied only to the case where the size of the target is equal to or greater than the minimum size and is less than or equal to the maximum size. That is, the embodiments may be applied only to the case where the size of the target falls within a certain range.

For example, the embodiments may be applied only to the case where the size of the target block is equal to or greater than 8×8. For example, the embodiments may be applied only to the case where the size of the target block is 4×4. For example, the embodiments may be applied only to the case where the size of the target block is less than or equal to 16×16. For example, the embodiments may be applied only to the case where the size of the target block is equal to or greater than 16×16 and is less than or equal to 64×64.

Whether to apply the embodiments may be decided on depending on a temporal layer. In order to identify the temporal layers to which embodiments are to be applied, separate identifiers may be signaled. The embodiments may be selectively applied to temporal layers specified by identifiers. Here, such an identifier may indicate the lowest layer and/or the highest layer to which the embodiments are to be applied, and may also indicate a specific layer to which the embodiments are to be applied. Further, a temporal layer to which the embodiments are to be applied may be predefined.

For example, the embodiments may be applied only to the case where the temporal layer of a target image is the lowest layer. For example, the embodiments may be applied only to the case where the temporal layer identifier of the target image is equal to or greater than 1. For example, the embodiments may be applied only to the case where the temporal layer of a target image is the highest layer.

The slice type to which the embodiments are to be applied may be defined. Depending on the slice type, the embodiments may be selectively applied.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A decoding method, comprising:
performing a determination as to whether to perform decoding on three blocks using coding determination information shared for the three blocks; and
performing the decoding on the three blocks using the coding determination information based on the determination,
wherein the three blocks comprise a luma block and two chroma blocks, and
the coding determination information is applied to the three blocks as a single tree structure is used for the luma block and the two chroma blocks.

2. An encoding method, comprising:
generating information for three blocks by performing encoding for the three blocks;
wherein the three blocks are encoded using coding determination information shared for the three blocks,
the three blocks comprise a luma block and two chroma blocks, and
the coding determination information is applied to the three blocks as a single tree structure is used for the luma block and the two chroma blocks.

3. A non-transitory computer-readable medium storing a bitstream generated by the encoding method of claim 2.

4. A non-transitory computer-readable medium storing a bitstream, the bitstream comprising:
information for three blocks;
wherein decoding for the three blocks is performed using the information for the three blocks,
a determination as to whether to perform the decoding on the three blocks using a coding determination information shared for the three blocks is performed,
the decoding on the three blocks using the coding determination information is performed based on the determination,
the three blocks comprise a luma block and two chroma blocks, and
the coding determination information is applied to the three blocks as a single tree structure is used for the luma block and the two chroma blocks.

5. The decoding method of claim 1, wherein the coding determination information is applied to the three blocks as the luma block and the two chroma blocks use an identical partitioning structure.

6. The decoding method of claim 1, wherein the coding determination information is applied to the luma block and the two chroma blocks having corresponding positions in a case that the luma block and the two chroma blocks have different partition structures, respectively.

7. The decoding method of claim 6, wherein, when a position of the upper-leftmost pixel, a horizontal width and a vertical width of each chroma block of the two chroma blocks are (xCb, yCb), cbWidth and cbHeight, respectively, the luma block corresponding to the two chroma blocks is a block that occupies a position (xCb+cbWidth/2, yCb+cbHeight/2) within an area of a luma channel.

8. The decoding method of claim 1, wherein the coding determination information is applied to the luma block and the two chroma blocks having corresponding positions as a dual tree structure is used for the luma block and the two chroma blocks.

9. The decoding method of claim 1, wherein the coding determination information is information indicating whether a position dependent intra prediction is performed for the three blocks or not.

10. The encoding method of claim 2, wherein the coding determination information is applied to the luma block and the two chroma blocks having corresponding positions in a case that the luma block and the two chroma blocks have different partition structures, respectively.

11. The encoding method of claim 10, wherein:
when a position of the upper-leftmost pixel, a horizontal width and a vertical width of each chroma block of the two chroma blocks are (xCb, yCb), cbWidth and cbHeight, respectively, the luma block corresponding to the two chroma blocks is a block that occupies a position (xCb+cbWidth/2, yCb+cbHeight/2) within an area of a luma channel.

12. The encoding method of claim 2, wherein the coding determination information is applied to the luma block and the two chroma blocks having corresponding positions as a dual tree structure is used for the luma block and the two chroma blocks.

13. The encoding method of claim 2, wherein the coding determination information is information indicating whether a position dependent intra prediction is performed for the three blocks or not.

14. The non-transitory computer-readable medium of claim 4, wherein the coding determination information is applied to the luma block and the two chroma blocks having corresponding positions in a case that the luma block and the two chroma blocks have different partition structures, respectively.

15. The non-transitory computer-readable medium of claim 14, wherein:
when a position of the upper-leftmost pixel, a horizontal width and a vertical width of each chroma block of the two chroma blocks are (xCb, yCb), cbWidth and cbHeight, respectively, the luma block corresponding to the two chroma blocks is a block that occupies a position (xCb+cbWidth/2, yCb+cbHeight/2) within an area of a luma channel.

16. The non-transitory computer-readable medium of claim 4, wherein the coding determination information is applied to the luma block and the two chroma blocks having corresponding positions as a dual tree structure is used for the luma block and the two chroma blocks.

17. The non-transitory computer-readable medium of claim 4, wherein the coding determination information is information indicating whether a position dependent intra prediction is performed for the three blocks or not.

* * * * *